US009316765B2

(12) United States Patent
Mori et al.

(10) Patent No.: US 9,316,765 B2
(45) Date of Patent: Apr. 19, 2016

(54) PHOTOCHROMIC COMPOSITION

(71) Applicant: Tokuyama Corporation, Yamaguchi (JP)

(72) Inventors: Katsuhiro Mori, Yamaguchi (JP); Toshimitsu Hiraren, Yamaguchi (JP); Yasutomo Shimizu, Yamaguchi (JP); Kazuhiro Teranishi, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 113 days.

(21) Appl. No.: 14/366,700

(22) PCT Filed: Dec. 13, 2012

(86) PCT No.: PCT/JP2012/082393
§ 371 (c)(1),
(2) Date: Jul. 23, 2014

(87) PCT Pub. No.: WO2013/099640
PCT Pub. Date: Jul. 4, 2013

(65) Prior Publication Data
US 2014/0340727 A1    Nov. 20, 2014

(30) Foreign Application Priority Data

Dec. 26, 2011 (JP) .................. 2011-283532

(51) Int. Cl.
*G02F 1/03* (2006.01)
*G02B 1/04* (2006.01)
(Continued)

(52) U.S. Cl.
CPC ............... *G02B 1/041* (2013.01); *B29D 11/00* (2013.01); *C08G 18/10* (2013.01); *C08G 18/282* (2013.01); *C08G 18/285* (2013.01); *C08G 18/2875* (2013.01); *C08G 18/325* (2013.01);
(Continued)

(58) Field of Classification Search
CPC ......................................................... G02B 5/23
USPC ......................................................... 359/241
See application file for complete search history.

(56) References Cited

U.S. PATENT DOCUMENTS 5,820,988 A    10/1998 Nagaoka
6,367,930 B1    4/2002 Santelices et al.
(Continued)

FOREIGN PATENT DOCUMENTS

JP    2003-519398 A    6/2003
JP    2005-509704 A    4/2005
(Continued)

OTHER PUBLICATIONS

Translation of International Preliminary Report on Patentability, dated Jul. 2014.
(Continued)

*Primary Examiner* — James Jones
(74) *Attorney, Agent, or Firm* — Cahn & Samuels, LLP

(57) ABSTRACT

A photochromic composition functions as an adhesive layer for bonding optical sheets or films made from a polycarbonate resin or the like, and can be used to produce a laminated sheet that exhibits excellent adhesive properties, heat resistance, photochromic properties, and perspiration resistance. The photochromic composition includes (A) a polyurethane-urea resin having a urea bond in a molecular chain, in which a tetrahydrofuran insoluble content is 20.0 to 90.0 wt %; and (B) a photochromic compound.

10 Claims, 1 Drawing Sheet

(51) Int. Cl.
  *C09K 9/02* (2006.01)
  *G02B 5/23* (2006.01)
  *G03C 1/73* (2006.01)
  *C08G 18/75* (2006.01)
  *C08G 18/10* (2006.01)
  *C08G 18/42* (2006.01)
  *C08G 18/44* (2006.01)
  *G02C 7/10* (2006.01)
  *B29D 11/00* (2006.01)
  *C08G 18/73* (2006.01)
  *C08G 18/28* (2006.01)
  *C08G 18/32* (2006.01)
  *C09J 175/02* (2006.01)
  *C09J 175/06* (2006.01)

(52) U.S. Cl.
  CPC ............ *C08G18/4277* (2013.01); *C08G 18/44* (2013.01); *C08G 18/73* (2013.01); *C08G 18/755* (2013.01); *C08G 18/757* (2013.01); *C09J 175/02* (2013.01); *C09J 175/06* (2013.01); *C09K 9/02* (2013.01); *G02B 1/04* (2013.01); *G02B 5/23* (2013.01); *G02C 7/102* (2013.01); *G03C 1/73* (2013.01)

(56) References Cited

U.S. PATENT DOCUMENTS

| | | |
|---|---|---|
| 2001/0050356 A1 | 12/2001 | Crano et al. |
| 2003/0096935 A1 | 5/2003 | Nagpal et al. |
| 2003/0105265 A1 | 6/2003 | Mcdonald |
| 2003/0193044 A1 | 10/2003 | Henry et al. |
| 2004/0096666 A1 | 5/2004 | Knox et al. |
| 2004/0138401 A1* | 7/2004 | Bojkova ............... C07D 339/06 528/44 |

FOREIGN PATENT DOCUMENTS

| | | |
|---|---|---|
| JP | 2005-520034 A | 7/2005 |
| JP | 2006-509901 A | 3/2006 |
| JP | 2006-513276 A | 4/2006 |
| JP | 2007-138186 A | 6/2007 |
| JP | 2012-167245 A | 9/2012 |

OTHER PUBLICATIONS

English abstract of JP 2007-138186.
English abstract of JP 2005-509704.
English abstract of JP 2005-520034.
English abstract of JP 2006-513276.
English abstract of JP 2006-509901.
English abstract of JP 2012-167245.
English abstract of JP 2003-519398.

* cited by examiner

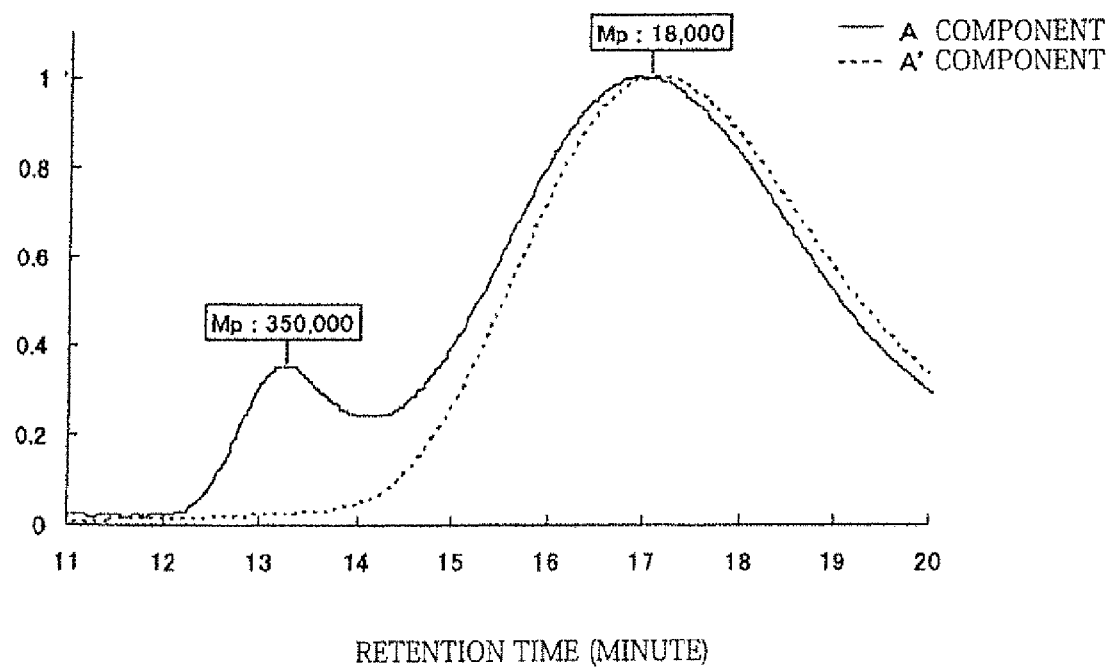

PHOTOCHROMIC COMPOSITION

This application is a U.S. national stage application of PCT/JP2012/082393 filed on 13 Dec. 2012, and claims priority of Japanese patent document 2011-283532 filed on 26 Dec. 2011, the entireties of which are incorporated herein by reference.

TECHNICAL FIELD

The present invention relates to a novel photochromic composition suitably used as a photochromic adhesive agent, particularly as a photochromic adhesive agent for binding optical sheets or films made of polycarbonate resins with each other. Also, the present invention relates to an optical article including a multilayer structure made by binding the optical sheets or films with each other via the adhesive layer comprising the photochromic composition.

BACKGROUND OF THE INVENTION

Recently especially in United States, the needs is rapidly increasing for the plastic base material using a polycarbonate of transparent and having excellent impact resistance, for the use of the sunglasses with a anti glare property. Further, in regards with such plastic sunglass, the photochromic sunglass made of plastic is rapidly becoming popular which can control the anti glare property by changing a transparency depending on the surrounding brightness by combining with a photochromic pigments. Such sunglasses can be produced by the following method.

For example, as a method for producing photochromic sunglasses made from plastic having a high impact resistance, a known method is to produce said sunglasses by dispersing a photochromic compound into a polyurethane-urea resin (refer to Patent Literature 1 to 4). These documents describe a method in which a composition including a polyurethane-urea resin and a photochromic compound is used as is to make the sunglasses (body casting method), and a method in which said composition is coated onto a base material formed from other materials to make the sunglasses (coating method). According to these methods, since the photochromic compound is dispersed in the polyurethane-urea resin, sunglasses having a high impact resistance and excellent photochromic characteristics can be produced.

However, since these methods are methods for directly producing sunglasses, these methods have not been widely used for other applications. For example, since in the body casting method the composition is poured into a lens mold, it has not been possible to use this method for other shapes. Further, for the coating method also, since a coating layer is formed by coating the composition on a lens base material, it has not been possible to use this method for other shapes.

In order to improve on the above points, proposals such as the following have been made. For example, a lot of investigation has gone into methods using a polyurethane adhesive layer including a photochromic compound to impart photochromic characteristics to variously shaped base materials. Specific examples include methods of using a "multilayer sheet binding the polycarbonate sheet with a polyurethane resin adhesive layer containing a photochromic pigment" (refer to Patent Literature 5 and 6). Using such a multilayer sheet enables photochromic characteristics to be imparted to various base materials regardless of their shape. Specific examples of a method for producing sunglasses that utilize this multilayer sheet include a method in which said multilayer sheet is installed into a metal mold and a polycarbonate resin is injection molded therein.

However, in these conventional methods, the adhesion of the polycarbonate sheet in the above-described multilayer sheet and the heat resistance of the adhesive layer itself are insufficient. Consequently, when an optical article is produced by installing the multilayer sheet into a metal mold and then injection molding a polycarbonate resin into said metal mold, there were problems such as peeling of the obtained optical article and optical strain or so.

Further, based on investigations by the present inventors, in the method that uses the above-described multilayer sheet, it was learned that when the polyurethane-urea resin described in Patent Literature 1 to 4 was used for the polyurethane resin adhesive layer, for example, the adhesion to the polycarbonate are not sufficient.

In addition, depending on how they are used, photochromic sunglasses may need to have "perspiration resistance" (there is a need for sunglasses that do not undergo a state change even when they come into contact with human perspiration). However, for sunglasses that use a conventional multilayer sheet, peeling of the polycarbonate sheet and the like is observed, so that such sunglasses do not sufficiently meet this need.

CITATION LIST

Patent Literature

[Patent 1] Japanese Patent Laid-Open No. 2007-138186
[Patent 2] Japanese Patent Laid-Open No. 2005-509704
[Patent 3] National Publication of International Patent Application No. 2005-520034
[Patent 4] National Publication of International Patent Application No. 2006-513276
[Patent 5] National Publication of International Patent Application No. 2003-519398
[Patent 6] US Patent Application Publication No. 2004-096666

SUMMARY OF INVENTION

The object of the present invention is, firstly, to provide the photochromic composition having excellent adhesion (perspiration resistance) and heat resistance, and also exhibiting an excellent photochromic property when used as the adhesive layer for binding the optical sheets or the optical films.

Also, the second object of the present invention is to provide an optical article including the multilayer structure in which the optical sheets or the optical films are bound by the adhesive layer comprising the photochromic property, wherein said optical article has excellent adhesion and heat resistance, and further has excellent photochromic characteristic in said multilayer structure.

Further, the third object of the present invention is to provide a method of capable of producing the optical article without damaging the appearance even in case the thermoplastic resin such as polycarbonate or so is used as the optical sheet or the optical film.

In order to solve above mentioned problem, the present inventors have carried out keen examination concerning the relation between the structure of the photochromic polyurethane-urea resin adhesive layer and the characteristic of the obtained optical article. Consequently, it was discovered that (1) when a photochromic polyurethane-urea resin adhesive layer formed using a specific polyurethane-urea resin is used, the obtained multilayer sheet has excellent adhesion, heat resistance, perspiration resistance, photochromic characteristics, durability and the like, whereby the present invention was completed.

Namely, the present invention is a photochromic composition comprising (A) a polyurethane-urea resin having a urea bond in a molecular chain, in which a tetrahydrofuran insoluble content is 20.0 to 90.0 wt %, and (B) a photochromic compound.

The photochromic composition of the present invention functions as the adhesive agent or the binder, and when the laminated sheet binding the optical sheets or films formed of polycarbonate resin or so by using the adhesive layer formed of said composition, the obtained laminated sheet shows excellent adhesion and photochromic characteristic. Further, the obtained multilayer sheet has high perspiration resistance. Namely, the multilayer sheet exhibits excellent adhesion even after coming into contact with a population perspiration.

Further, as the above mentioned adhesive layer shows excellent heat resistance, even when the optical article is produced by installing the above mentioned laminated sheet into the metal mold and injection molding the thermoplastic resin such as polycarbonate resin or so in the metal mold, the adhesion and the photochromic characteristic barely declines, and thus the optical strain is unlikely to happen.

Also, according to the method of the present invention, even when the thermoplastic resin such as polycarbonate or so having low solvent resistance is used as the optical sheet or film, the bad influence caused by the solvent can be avoided; hence the photochromic property is not lowered.

BRIEF DESCRIPTION OF DRAWING

FIG. 1 is a GPC chart of (A') the soluble polyurethane-urea resin (U1) used in Example 1, and a GPC chart of (A) the polyurethane-urea resin of Example 1 obtained by cross-linking (U1).

DETAILED DESCRIPTION OF THE INVENTION

The photochromic composition of the present invention comprises (A) a polyurethane-urea resin having a urea bond in a molecular chain, in which a tetrahydrofuran insoluble content is 20.0 to 90.0 wt % (hereinafter it may be referred to as "A component"), and (B) a photochromic compound (hereinafter it may be referred to as "B component"). Herein below, these A component and B component will be described.

A Component: Polyurethane-Urea Resin

A component of the photochromic composition of the present invention is a polyurethane-urea resin having a urea bond (—R—NH—CO—NH—) in the molecular chain, in which a tetrahydrofuran insoluble content is 20.0 to 90.0 wt %. This tetrahydrofuran insoluble content is a value measured with the Soxhlet extractor described in the following method. The tetrahydrofuran soluble content of A component is 10.0 to 80.0 wt %, and the total mass of the insoluble content and the soluble content is 100 wt %.

The tetrahydrofuran insoluble content is a value ascertained based on the following method. Specifically, measurement was carried out by placing a glass fiber cylindrical filter (retained particle size 1 μm) charged with about 1 g of a film-like sample (sample shape: thickness 40 to 50 μm, about 10 cm×15 cm) into a Soxhlet extractor, and refluxing about 100 ml of tetrahydrofuran for 6 hours. After the refluxing was finished, the insoluble content remaining in the filter was dried in the whole filter, and its weight was measured. The difference with the filter weight before the test started was taken as the weight of the insoluble content. The tetrahydrofuran insoluble content was calculated by dividing this weight by the charged sample weight.

The present invention exhibits better effects by using A component. Namely, since a polyurethane-urea resin having a urea bond and a tetrahydrofuran insoluble content of 20.0 to 90.0 wt % is used, excellent effects can be exhibited. The inclusion of a tetrahydrofuran insoluble content means that a high-molecular-weight substance is included and that a large number of urea bond are included. The high-molecular-weight substance (e.g., a cross-linked product) tends to be insoluble in tetrahydrofuran. Further, a substance having high molecular weight and a large number of urea bond tends to be insoluble in tetrahydrofuran.

It is not clearly understood why better effects are exhibited by using such A component, however the present inventors speculate the following reasons. First, by having a urea bond in A component, the rigidity of the molecule is enhanced, and also the hydrogen bond between the molecular chains become further strong, thereby the heat resistance is thought to be improved. Further, since a tetrahydrofuran insoluble content is present (because of the inclusion of a large amount of a high-molecular-weight substance having a cross-linked structure), the heat resistance is thought to be further improved.

In addition, the reason why excellent photochromic characteristics are exhibited is believed to be as follows. In regards with the improvement of the durability of the photochromic compounds, the hydrogen bond between the molecular chains becomes further strong due to the presence of the urea bond, and further includes the tetrahydrofuran insoluble content (high-molecular-weight substance having a cross-linked structure); hence the oxygen in the air becomes difficult to disperse into said polyurethane-urea resin (A component), thereby the photooxidized degradation known as the general degradation system of photochromic compounds, is thought to be suppressed.

Still further, regarding the improvement of the adhesive strength of the photochromic composition including A component with an optical sheet or film, the hydrogen bond between the molecular chains becomes further strong due to the presence of the urea bond, and includes the tetrahydrofuran insoluble content (high-molecular-weight substance having a cross-linked structure); hence the cohesion failure of the resin become less likely to happen. Especially, the reason why the adhesive strength with an optical sheet or film can be maintained at a high level even after coming into contact with artificial perspiration (population perspiration) is thought to be due to having the urea bond and a specific amount of tetrahydrofuran insoluble content.

The A component used in the present invention has a tetrahydrofuran insoluble content of 20.0 to 90.0 wt %. The tetrahydrofuran insoluble content is preferably not more than 90.0 wt %, because adhesive strength with the optical sheet and film deteriorates. On the other hand, it is preferred that the tetrahydrofuran insoluble content is not less than 20.0 wt %, because adhesive strength, especially adhesive strength after coming into contact with population perspiration (hereinafter it may be referred to as "perspiration resistance") deteriorates. To improve adhesive strength and perspiration resistance in a normal state, the tetrahydrofuran insoluble content included in A component is preferably 25.0 to 80.0 wt %, and more preferably 30.0 to 70.0 wt %.

The method for producing the polyurethane-urea resin used as A component is not particularly limited, as long as the method produces a polyurethane-urea resin having a urea bond in the molecular chain, in which a tetrahydrofuran insoluble content is 20.0 to 90.0 wt %. For example, the tetrahydrofuran insoluble content may be adjusted so as to satisfy the above-described range by cross-linking the polyurethane-urea resin or by increasing the amount of a high molecular weight substance. Among such resins, it is preferred that A component includes a reaction product of (A) a polyurethane-urea resin having a urea bond in the molecular chain and that is soluble in tetrahydrofuran, and (C) a polyisocyanate compound having at least two isocyanate groups in the molecule, for the reason that photochromic characteristics and adhesion are good.

Hereinafter, these components will be described.

A' Component: Soluble Polyurethane-Urea Resin

The soluble polyurethane-urea resin (A' component) is 100 wt % soluble in tetrahydrofuran. Whether the component is soluble in tetrahydrofuran can be ascertained based on the above-described Soxhlet extraction using tetrahydrofuran described in the following Examples. Although this soluble polyurethane-urea resin (A' component) is not particularly limited as long as it has a urea bond in the molecular chain and is soluble in tetrahydrofuran, from the point of adhesion and photochromic characteristics, it is preferred to obtain A' component by reacting, (A1) at least one polyol compound selected from the group consisting of polycarbonate polyol and polycaprolactone polyol (hereinafter it may be referred to as "A1 component"),
(A2) a diisocyanate compound having two isocyanate groups in the molecule (hereinafter it may be referred to as "A2 component"),
(A3) an amino group-containing compound having two or more amino groups in the molecule (hereinafter it may be referred to as "A3 component"), and
(A4) a functionalization compound having one or two groups capable of reacting with the isocyanate groups in the molecule and having a piperidine structure in the molecule. In such a soluble polyurethane-urea resin (A' component), urea bond is introduced in the molecule as the amino group-containing compound is used as A3 component which is a source material. Hereinafter, these components will be described.

A1 Component: Polyol Compound

The polyol compound of A1 component preferably has 2 to 6 hydroxyl groups included in the molecule, because this prevents the produced soluble polyurethane-urea resin (A' component) from being overly cross-linked. In consideration of solubility to the organic solvent, the number of hydroxyl groups included in the molecule is preferably 2 to 3. Further, the above-described polyol compound, such as a polycarbonate polyol and a polycaprolactone polyol, may be used alone or may be used by combining two or more thereof. However, from the point of the heat resistance, the adhesion, the weather resistance, and the hydrolysis resistance and the like, it is particularly preferred to use a polycarbonate polyol.

Hereinafter, the various compounds used as A1 component will be described in detail.

Polycarbonate Polyol:

As for polycarbonate polyol used as A1 component; polycarbonate polyol obtained by phosgenation of one or more of low molecular polyols such as ethylene glycol, 1,2-propanediol, 1,3-propanediol, 2-methyl-1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethyleneglycol, dipropyleneglycol, neopentylglycol, cyclohexane-1,4-diol, cyclohexane-1,4-dimethanol, dimer acid diol, ethylene oxide adduct or propylene oxide adduct of bisphenol A, bis($\beta$-hydroxyethyl)benzene, xylene glycol, glycerin, trimethylolpropane, pentaerythritol; or polycarbonate polyol obtained by transesterification of the low molecular polyols with ethylenecarbonate, diethylcarbonate, and diphenylcarbonate or so may be mentioned. Among these low molecular polyols, from the point of the adhesion of the ultimately-obtained polyurethane-urea resin (A component) and the color optical density, a low molecular polyol having a linear alkyl chain is preferred. A polycarbonate polyol synthesized by a low molecular weight polyol having an alkyl group on a side chain tends to exhibit a deterioration in adhesion and photochromic characteristics.

For the polycarbonate polyol of A1 component, from the point of the heat resistance and the photochromic characteristics (color optical density, color fading speed, weather resistance etc.) of the ultimately-obtained polyurethane-urea resin (A component), in particular from the point of the weather resistance of the photochromic compound, the number average molecular weight is preferably 400 to 2000, more preferably 500 to 1500, and most preferably it is 600 to 1200.

These polycarbonate polyols can be obtained as a reagent or obtained industrially. Commercially available examples include the "DURANOL™" series made by Asahi Kasei Chemicals Corporation, the "Kuraray Polyol™" series made by Kuraray Co., Ltd., the "Praccel™" series made by Daicel Corporation, the "NIPPOLAN™" series made by Nippon Polyurethane Industry Co., Ltd., the "ETERNACOLL™" series made by Ube Industries Ltd., and the like.

Polycaprolactone Polyol:

As polycaprolactone polyol used for A1 component, the compound obtained by ring-opening polymerization of $\epsilon$-caprolactone can be used. For polycaprolactone polyol as A1 component, from the same reason as polycarbonate polyol, the number average molecular weight is preferably 400 to 2000, and more preferably it is 500 to 1500, and most preferably it is 600 to 1200.

Such a polycaprolactone polyol can be obtained as a reagent or obtained industrially. Commercially available examples include the "Praccel™" series made by Daicel Corporation and the like.

Further, as the polyol compound, in addition to A component of the present invention, the following polyether polyols, polyester polyols and the like may also be used together.

Polyether Polyol:

Examples of the polyether polyol may include polyether polyol compounds obtained by a reaction between an alkylene oxide and a compound having two or more of active hydrogen-containing groups in the molecule; and polymerpolyol, urethane-modified polyetherpolyol, and polyetherestercopolymer polyol and the like, which are the modification of said polyether polyol.

Note that examples of the compound having two or more active hydrogen-containing groups in the molecule may include water, and polyol compounds such as glycol or glycerin having one or more hydroxyl groups in the molecule, such as ethylene glycol, propylene glycol, butanediol, glycerin, trimethylolpropane, hexanetriol, triethanolamine, diglycerin, pentaerythritol, trimethylolpropane, and hexanetriol. These can be used alone or as a mixture of two kinds or more thereof.

Further, examples of said alkylene oxide may include cyclic ether compounds, such as ethylene oxide, propylene oxide, and tetrahydrofurane. These can be used alone or as a mixture of two kinds or more thereof.

For the same reasons as for the polycarbonate polyol, the polyetherpolyol preferably has a number average molecular weight of 400 to 2000, more preferably 500 to 1500, and most preferably 600 to 1200.

Such a polyether polyol can be obtained as a reagent or as obtained industrially. Commercially available examples include the "EXENOL™" series and the "EMULSTAR™" made by Asahi Glass Co., Ltd, and the "ADEKA POLY-ETHER" series made by ADEKA Corporation and the like.

Polyester Polyol:

As polyester polyol, polyester polyol obtained by condensation reaction between polyvalent alcohol and polybasic acid or so may be mentioned. Here, as said polyvalent alcohol, ethyleneglycol, 1,2-propanediol, 1,3-butanediol, 1,4-butanediol, 3-methyl-1,5-pentadiol, 1,6-hexanediol, 3,3'-dimethylolheptane, 1,4-cyclohexanedimethanol, neopentylglycol, 3,3-bis(hydroxymethyl)heptane, diethyleneglycol, dipropyleneglycol, glycerin, trimethylolpropane or so may be mentioned; and these may be used alone or by combining two or more thereof. Also, as said polybasic acid, succinic acid, adipic acid, azelaic acid, sebacic acid, dodecanedicarboxylic acid, cyclopentanedicarboxylic acid, cyclohexanedicarboxylic acid, ortophthalic acid, isophthalic acid, terephthalic acid, naphthalenedicarboxylic acid or so may be mentioned; and these may be used alone or by combining two or more thereof.

For the same reasons as for the polycarbonate polyol, the polyester polyol preferably has a number average molecular weight of 400 to 2000, more preferably 500 to 1500, and most preferably 600 to 1200.

These polyesterpolyol can be obtained as a chemical reagent or as for the industrial use, and as for the commercially available example; "POLYLITE™" series made by DIC Corporation, "NIPPOLAN™" series made by NIPPON POLYURETHANE INDUSTRY CO., LTD, "MAXIMOL™" series made by KAWASAKI KASEI CHEMICALS LTD or so may be mentioned.

A2 Component: The Diisocyanate Compounds

As the diisocyanate compound having two isocyanate group in the molecule which is used as A2 component in the present invention, an aliphatic diisocyanate compounds, an alicyclic diisocyanate compound, an aromatic diisocyanate compound, and the mixture thereof may be used. Among these, from the point of the weather resistance, the aliphatic diisocyanate compound and/or the alicyclic diisocyanate compound are preferably used. Also, as for the same reason, the aliphatic diisocyanate compound is preferably 30 to 100 wt %, particularly 50 to 100 wt % of the diisocyanate compound of A2 component.

For examples of diisocyanate compound suitably used for A2 component, the aliphatic diisocyanate compounds such as tetramethylene-1,4-diisocyanate, hexamethylene-1,6-diisocyanate, octamethylene-1,8-diisocyanate, 2,2,4-trimethylhexane-1,6-diisocyanate or so; the alicyclic diisocyanate compound such as cyclobutane-1,3-diisocyanate, cyclohexan-1,3-diisocyanate, cyclohexane-1,4-diisocyanate, 2,4-methylcyclohexyldiisocyanate, 2,6-methylcyclohexyldiisocyanate, isophoronediisocyanate, norbornenediisocyanate, isomer mixture of 4,4'-methylenebis(cyclohexylisocyanate), hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis(isocyanatomethyl)cyclohexane, 2-isocyanato-4-[(4-isocyanatocyclohexyl)methyl]-1-methylcyclohexane, 2-(3 isocyanatopropyl)cyclohexylisocyanate, norbornanodiisocyanate or so; the aromatic diisocyanate compound such as phenylcyclohexylmethandiisocyanate, isomer mixture of 4,4'-methylenebis(phenylisocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylenediisocyanate, tetramethlylxylylenediisocyanate, naphthalenediisocyanate, diphenyletherdiisocyanate, 1,3-diisocyanatomethylbenzene, 4,4'-diisocyanato-3,3'-dimethoxy (1,1'-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenylisocyanate, diphenylmethane diisocyanate or so may be mentioned.

Among these, from the point of the weather resistance of the obtained soluble polyurethane-urea resin (A' component), as well as of the ultimately-obtained polyurethane-urea resin (A component), as described above, it is preferred that 30 to 100 wt %, and particularly 50 to 100 wt %, of the diisocyanate compound of A2 component is at least one diisocyanate compound selected from the group consisting of an aliphatic diisocyanate compound and an alicyclic diisocyanate compound. As specific examples of preferable compounds, tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyldiisocyanate, 2,6-methylcyclohexyldiisocyanate, isophoronediisocyanate, norbornanediisocyanate, isomer mixture of 4,4'-methylenebis(cyclohexylisocyanate), hexahydrotoluene-2,4-diisocyanate, hexahydrotoluene-2,6-diisocyanate, hexahydrophenylene-1,3-diisocyanate, hexahydrophenylene-1,4-diisocyanate or so may be mentioned. These isocyanate compounds may be used alone or by combining two or more thereof.

A3 Component: Amino Group-Containing Compound

The amino group-containing compound used as A3 component in the present invention is an amino group-containing compound having two or more amino groups ($-NH_2$, or $-NH(R)$, wherein R represents an alkyl group, particularly an alkyl group having 1 to 5 carbon atoms) in the molecule.

Said A3 component functions as a chain extender when synthesizing the soluble polyurethane-urea resin (A' component). By using A3 component as the chain extender, the urea bond is introduced into the polyurethane resin, thereby forming the polyurethane-urea resin.

In order for the obtained soluble polyurethane-urea resin (A' component) to have a suitable hardness, and also to maintain the heat resistance, adhesion, and photochromic characteristics in a good condition, the amino group-containing compound preferably has a molecular weight of 50 to 300, more preferably 50 to 250, and most preferably 100 to 220.

As the amino group-containing compound of A3 component, at least one compound selected from the group consisting of diamine and triamine can be preferably used. Specific examples of compounds that can be preferably used as the amino group-containing compound in the present invention include isophoronediamine, ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis-(2-aminoethyl)piperazine, bis-(4-aminocyclohexyl)methane, bis-(4-amino-3-butylcyclohexyl)methane, 1,2-, 1,3- and 1,4-diaminocyclohexane, norbornanediamine, hydrazine, dihydrazine adipate, phenyldiamine, 4,4'-diphenylmethandiamine, N,N'-diethylethylenediamine, N,N'-dimethylethylenediamine, N,N'-dipropylethylenediamine, N,N'-dibutylethylenediamine, N-methylethylenediamine, N-ethylethylenediamine, bis(hexamethylene)triamine, 1,2,5-pentatriamine or so may be mentioned.

As for the amino group containing compounds, from the point of the heat resistance, the adhesion, and the durability of the photochromic compounds, particularly diamine compounds are preferably used. The reason for this is because by using the amino group containing compound when synthesizing A' component, the obtained soluble polyurethane-urea resin (A' component) has the urea bond; thereby the rigidity of the molecule increases and also the hydrogen bond between the molecular chain becomes stronger, thus it is speculated that the heat resistance is enhanced. Also, in regards with the improvement of the durability of the photochromic compounds, the hydrogen bond between the molecular chain becomes further strong due to the presence of the urea bond; hence the oxygen in the air becomes difficult to disperse into said soluble polyurethane-urea resin (A' component); thereby the photooxidized degradation known as the general degradation system of photochromic compounds is thought to be suppressed. Further, regarding the improvement of the adhesive strength, the hydrogen bond between the molecular chain becomes further strong due to the presence of the urea bond; hence the cohesion failure of the resin becomes less likely to happen.

Further, from the point of the water resistance and stability in the perspiration resistance test, among the above-described amino group-containing compounds, it is preferred to use isophoronediamine, bis-(4-aminocyclohexyl)methane, or norbornanediamine. Of these, it is most preferred to use bis-(4-aminocyclohexyl)methane.

A4 Component: Functionalization Compound

A4 component used in the present invention is a functionalization compound having in the molecule one or two groups capable of reacting with the isocyanate groups, and having a piperidine structure in the molecule. The functionalization compound may also have a hindered phenol structure, a triazine structure, or a benzotriazol structure instead of a piperidine structure. However, a functionalization compound having a piperidine structure exhibits the best effects.

By using such a functionalization compound, a piperidine structure can be introduced into the soluble polyurethane-urea resin (A' component). Consequently, a polyurethane-urea resin (A component) having excellent functionality, such as photostability, antioxidation property, and ultraviolet ray absorbing property, can be obtained from the soluble polyurethane-urea resin (A' component) having these excellent functional properties.

Functionalization Compound Having One or Two Groups in the Molecule Capable of Reacting with the Isocyante Groups and Having a Piperidine Structure in the Molecule As the group capable of reacting with the isocyanate group, the amino group (—$NH_2$, and —NH(R)), the hydroxyl group (—OH), the mercapto group (—SH:thiol group), the carboxyl group (—C(=O)OH) or chloride group (—C(=O)OCl) or so may be mentioned. Particularly, in order to obtain the soluble polyurethane-urea resin (A' component) exhibiting excellent effect, the group capable of reacting with this isocyanate group is preferably one in the molecule. This reason is not clear, however the following reasons is thought to be the reason. By having only one said group, the functionalization compound is introduced to the side chain or the terminal end of the soluble polyurethane-urea resin (A' component). Therefore, the functionalization compound is thought to act efficiently to the substance which lowers the durability of the radical or so.

Further, the above-described piperidine structure especially exhibits a photo stabilization effect. By using a compound having such a structure, the durability (photo stability) of A' component, or A component itself and of the photochromic compound can be improved. Hereinafter, various compounds used as A4 component will be described in detail.

The Functionalization Compound Having the Piperidine Structure

As for the functionalization compound having the piperidine structure used as A4 component in the present invention, the compound having the structure shown in the following general formula can be used suitably.

[Chemical formula 1]

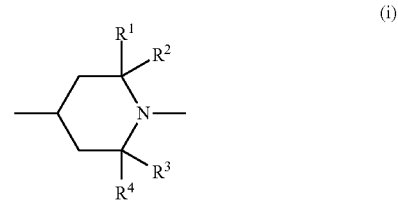

(i)

(in the above formula, $R^1$, $R^2$, $R^3$, and $R^4$ are preferably alkyl group having carbon atoms of 1 to 4 respectively, and particularly it is methyl group.)

The compound having nitrogen atom of above piperidine ring or the group capable of reacting with the isocyanate group at the carbon atom of the fourth position corresponds to the functionalization compound having the piperidine structure.

Hereinafter, further specific compound will be described.

Among the functionalization compound used as A4 component in the present invention, as for the compound which can introduce the piperidine structure at the terminal end of the soluble polyurethane-urea resin (A' component), the compounds shown by the following general formula (1) may be mentioned.

[Chemical formula 2]

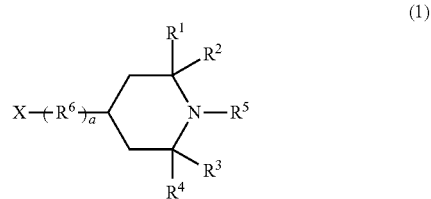

(1)

(in the above formula, $R^1$, $R^2$, $R^3$, and $R^4$ are same as in said general formula (i), $R^5$ is alkyl group having carbon atoms of 1 to 10 or hydrogen, $R^6$ is alkylene group having carbon atoms of 1 to 20 or polymethylene group having carbon atoms of 3 to 20, a is 0 or 1, and X is the group capable of reacting with the isocyanate group.)

In the above mentioned general formula (1), $R^1$, $R^2$, $R^3$, and $R^4$ are independent an alkyl group having carbon atoms of 1 to 4 respectively, however it is preferable that all four alkyl groups are methyl group.

$R^5$ is an alkyl group having carbon atoms of 1 to 10 or hydrogen. Among these, from the point of easiness to obtain, it is preferably an alkyl group having carbon atoms of 1 to 4, or hydrogen. Note that, since $R^1$, $R^2$, $R^3$, and $R^4$ are alkyl group having carbon atoms of 1 to 4, thus even if $R^5$ is hydrogen atom, the nitrogen atom where $R^5$ is bonded will not react with the isocyanate group due to the steric hindrance.

$R^6$ is alkylene group having carbon atoms of 1 to 20 or polymethylene group having carbon atoms of 3 to 20; however preferably it is alkylene group having carbon atoms of 1 to 10, or polymethylene group having carbon atoms of 3 to 10. Note that, when a is 0, it indicates that X is directly bonded to the piperidine ring.

X is a group capable of reacting with the isocyanate group, and preferably it is the amino group, the hydroxyl group, the carboxyl group or the thiol group. Among these, the amino group and hydroxyl group are preferable from the point of the reactivity with the isocyanate group and easiness to obtain.

As for specific examples of the functionalization compound shown by the above formula (1), 1,2,2,6,6-pentamethyl-4 hydroxypiperidine, 1,2,2,6,6-pentamethyl-4-aminopiperidine, 2,2,6,6-tetramethyl-4-hydroxypiperidine, 2,2,6,6-tetramethyl-4-aminopiperidine, 1,2,2,6,6-pentamethyl-4-aminomethylpiperidine, and 1,2,2,6,6-pentamethyl-4-aminobutylpiperidine or so may be mentioned.

Also, as for the compound which can introduce the piperidine structure to the terminal end of the soluble polyurethane-urea resin (A' component), the following compound which is the reaction product between dimethyl succinate and 4-hydroxy-2,2,6,6-tetramethyl-1-piperidineethanol can be used.

[Chemical Formula 3]

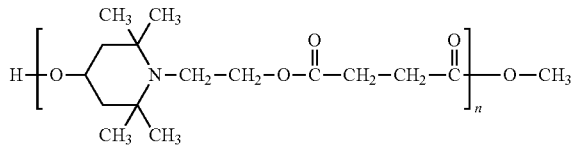

Note that, in the above compound, n preferably satisfies the range of 5 to 20.

Among A4 component used in the present invention, as for the compound which can introduce the piperidine structure into the main chain of the soluble polyurethane-urea resin (A' component), the compounds shown by the following general formula (2), (3), (4) can be preferably used.

[Chemical Formula 2]
Following the formula (2)

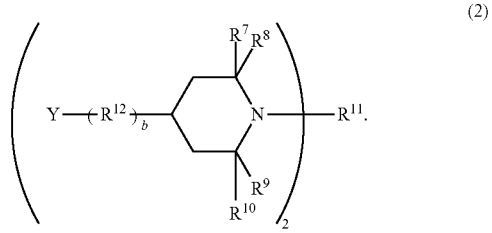

(in the above formula, $R^7$, $R^8$, $R^9$ and $R^{10}$ are alkyl group having carbon atoms of 1 to 4 respectively, $R^{11}$ is an alkylene group having carbon atoms of 1 to 20, or a polymethylene group having carbon atoms of 3 to 20, $R^{12}$ is an alkylene group having carbon atoms of 1 to 20, or a polymethylene group having carbon atoms of 3 to 20, and Y is the group capable of reacting with the isocyanate group.)

The compound shown in the above can be suitably used as well.

In the above general formula (2), $R^7$, $R^8$, $R^9$, and $R^{10}$ are alkyl group having carbon atoms of 1 to 4 respectively; however it is preferable that all four alkyl groups are methyl group.

$R^{11}$ is an alkylene group having carbon atoms of 1 to 20, or polymethylene group having carbon atoms of 3 to 20; and it is preferably alkylene group having carbon atoms of 1 to 10, or polymethylene group having carbon atoms of 3 to 10.

$R^{12}$ is alkylene group having carbon atoms of 1 to 20, or polymethylene group having carbon atoms of 3 to 20; and it is preferably alkylene group having carbon atoms of 1 to 10, or polymethylene group having carbon atoms of 3 to 10. Note that, when b is 0, it indicates that Y is directly bonded to the piperidine ring.

Y is same as X shown in said general formula (1).

As examples of the functionalization compound shown in the above formula (2), the following compounds may be mentioned.

[Chemical formula 5]

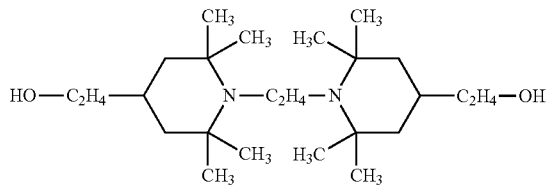

Following formula (3)
[Chemical formula 6]

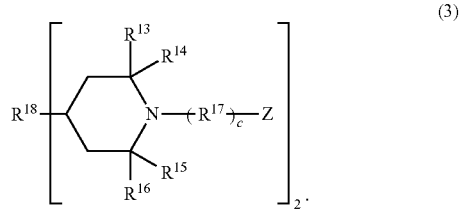

(in the above formula, $R^{13}$, $R^{14}$, $R^{15}$ and $R^{16}$ are independent alkyl group having carbon atoms of 1 to 4 respectively, $R^{17}$ is alkylene group having carbon atoms of 1 to 20 or polymethylene group having carbon atoms of 3 to 20, c is 0 or 1, $R^{18}$ is alkylene group having carbon atoms of 1 to 20 or polymethylene group having carbon atoms of 3 to 20, and Z is a group capable of reacting with the isocyanate group.)

The compound shown in the above can be suitably used.

In the above mentioned general formula (3), $R^{13}$, $R^{14}$, $R^{15}$ and $R^{16}$ are independent alkyl group having carbon atoms of 1 to 4 respectively; however it is preferable that all four alkyl groups are methyl group.

$R^{17}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10. Note that, when c is 0, it indicates that Z is directly bonded to piperidine ring.

$R^{18}$ is alkylene group having carbon atoms of 1 to 20 or polymethylene group having carbon atoms of 3 to 20.

Z is same as X in said general formula (1).

Examples of piperidine ring-containing compounds represented by the above general formula (3) include bis(2,2,6,6-tetramethyl-1-methoxy-4-piperidinyl)sebacate and the like.

[Chemical Formula 7]

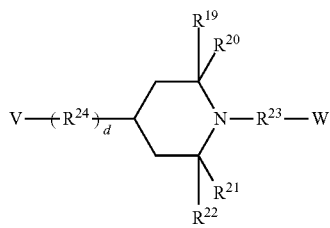

(4)

(in the above formula, $R^{19}$, $R^{20}$, $R^{21}$, and $R^{22}$ are alkyl group having carbon atoms of 1 to 4 respectively, $R^{23}$ is alkylene group having carbon atoms of 1 to 20, or a polymethylene group having carbon atoms of 3 to 20, $R^{24}$ is alkylene group having carbon atoms of 1 to 20, or a polymethylene group having carbon atoms of 3 to 20, and V and W are respectively the group capable of reacting with the isocyanate group.)

In the above described general formula (4), $R^{19}$, $R^{20}$, $R^{21}$, and $R^{22}$ are alkyl group having carbon atoms of 1 to 4 respectively; however it is preferable that all four alkyl groups are methyl group.

$R^{23}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10, $R^{24}$ is alkylene group having carbon atoms of 1 to 20 or polymethylene group having carbon atoms of 3 to 20; and preferably it is alkylene group having carbon atoms of 1 to 10 or polymethylene group having carbon atoms of 3 to 10. Note that, d is 0 or 1, and when d is 0, it indicates that V is directly bonded to the piperidine ring.

Also, V and W are same as X in said general formula (1), and it may be the same group or different group.

Examples of piperidine ring-containing compounds represented by the above general formula (4) include 4-hydroxy-2,2,6,6-tetramethyl-1-piperidine ethanol and the like.

(Preferred A4 Component, and Introduction Position Thereof)

The above-described A4 component can be introduced into any position, such as a terminal end, the main chain, or a side chain, of the soluble polyurethane-urea resin (A' component) for the purpose of improving the weather resistance of the polyurethane-urea resin (A component) and the photochromic compound. Among these positions, from the point of that it does not damage the innate heat resistance and the mechanical strength (adhesive strength) of (A') the soluble polyurethane-urea resin, it is preferred that A4 component is introduced at a terminal end of (A') the soluble polyurethane-urea resin. By increasing the heat resistance and the adhesive strength of (A') the soluble polyurethane-urea resin, the performance of (A) the polyurethane-urea resin that includes a reaction product obtained by reacting (A') the soluble polyurethane-urea resin and (C) component, which is described in detail below, can be substantially improved.

Preferred examples of the above-described A4 component include 1,2,2,6,6-pentamethyl-4-hydroxypiperidine, 1,2,2,6,6-pentamethyl-4-aminopiperidine, 2,2,6,6-tetramethyl-4-hydroxypiperidine, 2,2,6,6-tetramethyl-4-aminopiperidine, 1,2,2,6,6-pentamethyl-4-aminomethylpiperidine, and 1,2,2,6,6-pentamethyl-4-aminobutylpiperidine.

The Synthesizing Method of A' Component

In case of obtaining A' component by reacting the above-described A1 component, A2 component, A3 component, and A4 component, a so-called one shot method or a prepolymer method can be used. For example, A' component can be preferably obtained by the following method.

The Synthesizing Method 1 (A' Component Having a Functionalization Compound at a Terminal End)

First, a urethane prepolymer is obtained by reacting A1 component and A2 component. Then, said urethane prepolymer is reacted with A3 component to synthesize a polyurethane-urea resin having an isocyanate group at a terminal end. Lastly, A4 component is added to synthesize A' component of the present invention.

In the above-described method, the reaction between A1 component and A2 component may be carried out under the presence or absence of a solvent, and in either case, under an inert gas atmosphere such as nitrogen or argon at 25 to 120° C. for 0.5 to 24 hours. Examples of solvents that can be used include organic solvents such as methylethylketone, diethylketone, toluene, hexane, heptane, ethyl acetate, dimethylformamide (DMF), dimethylsulfoxide (DMSO), and tetrahydrofurane (THF). Upon carrying out the reaction, in order to avoid a reaction between the isocyanate group in the diisocyanate compound and water as an impurity, it is preferred to carry out the dehydration treatment to various reaction agents and solvents in advance, and dry sufficiently. Further, when carrying out the above-described reaction, a catalyst such as dibutyl tin laurylate, dimethylimidazole, triethylenediamine, tetramethyl-1,6-hexadiamine, tetramethyl-1,2-ethanediamine, and 1,4-diazabicyclo[2,2,2]octane may be used. As for the added amount when using the catalyst, it is preferably 0.001 to 1 parts by weight with respect to a total of 100 parts by weight of said A' component.

The reaction between the thus-obtained urethane prepolymer and A3 component may be carried out under the presence or absence of a solvent, and in either case, under an inert gas atmosphere such as nitrogen or argon at 0 to 100° C. for 0.5 to 24 hours. Examples of solvents that can be used include methanol, ethanol, isopropyl alcohol, t-butanol, 2-butanol, n-butanol, methylethylketone, diethylketone, toluene, hexane, heptane, ethyl acetate, DMF, DMSO, THF and the like.

The reaction between the thus-obtained polyurethane-urea resin having an isocyanate group at a terminal end and A4 component may be carried out under the presence or absence of a solvent, and in either case, under an inert gas atmosphere such as nitrogen or argon at 0 to 120° C. for 0.5 to 24 hours. Examples of solvents that can be used include methanol, ethanol, isopropyl alcohol, t-butanol, 2-butanol, n-butanol, methylethylketone, diethylketone, toluene, hexane, heptane, ethyl acetate, DMF, DMSO, THF and the like.

The Synthesizing Method 2 (A' Component Having the Functionalization Compound at the Main Chain)

A1 component and A2 component are reacted to obtain the urethane prepolymer, then A4 component is mixed/reacted which has, in the molecule, the group capable of reacting with two isocyanate groups to obtain the urethane prepolymer comprising the functionalization compound. Then, by reacting said urethane prepolymer with A3 component, A' component of the present invention can be produced.

In the above method, the reaction between A1 component and A2 component, and further the reaction with A4 component may be carried out under the presence of the solvent or without the solvent, in the atmosphere of the inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently. Also, when carrying out the reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be added. As for the added amount when using the catalyst, it is preferably 0.001 to 1 parts by weight with respect to total 100 parts by weight of said A component.

The reaction between the urethane prepolymer obtained as such and A3 component may be carried out under the presence of the solvent or without the solvent, in the atmosphere of inert gas such as nitrogen or argon or so at 0 to 100° C. for 0.5 to 24 hours. As for the solvent, methanol, ethanol, isopropyl alcohol, t-butanol, 2-butanol, n-butanol, methylethyl ketone, diethyl ketone, toluene, hexane, heptane, ethyl acetate, DMF, DMSO, THF, or so can be used.

The Synthesizing Method 3 (A' Component Having the Functionalization Compound at the Side Chain)

First, A4 component comprising, in the molecule, one group capable of reacting with isocyanate group and the triisocyanate compound comprising three isocyanate groups are reacted to synthesize the diisocyanate compound having the functionalization structure the side chain. The urethane prepolymer is obtained by reacting this diisocyanate compound and A1 compound and A2 compound; next by reacting A3 component, the A component of the present invention can be produced.

In the above method, the reaction between the triisocyanate compound and A4 component may be carried out under the presence of the solvent or without the solvent, in the atmosphere of inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently.

The reaction between the diisocyanate group having the functionalization compound at the side chain obtained by the above described method, A1 component, and A2 component may be carried out under the presence of the solvent or without the solvent, in the atmosphere of inert gas such as nitrogen or argon or so at 25 to 120° C. for 0.5 to 24 hours. As for the solvent, the organic solvent such as methylethyl ketone, diethyl ketone, toluene, hexane, heptane, ethyl acetate, dimethylformamide (DMF), dimethylsulfoxide (DMSO), tetrahydrofuran (THF) or so can be used. Upon carrying out the reaction, in order to avoid the reaction between the isocyanate group in the polyisocyanate compound and water as an impurity, it is preferable to carry out the dehydration treatment to various reaction agents and solvents in advance, and dry sufficiently. Also, when carrying out the reaction, the catalyst such as dibutyl tin laurylate, dimethylimidazole, triethylenediamine, tetramethyl-1,6-hexadiamine, tetramethyl-1,2-ethanediamine, 1,4-diazabicyclo[2,2,2]octane or so may be added. As for the added amount when using the catalyst, it is preferably 0.001 to 1 part by weight with respect to total 100 parts by weight of said A component.

The reaction between the urethane prepolymer obtained as such and A3 component may be carried out under the presence of the solvent or without the solvent, in the atmosphere of inert gas such as nitrogen or argon or so at 0 to 100° C. for 0.5 to 24 hours. As for the solvent, methanol, ethanol, isopropyl alcohol, t-butanol, 2-butanol, n-butanol, methylethyl ketone, diethyl ketone, toluene, hexane, heptane, ethyl acetate, DMF, DMSO, THF, or so can be used.

(Used Amount of A1, A2, A3, and A4 Components in the Synthesis of (A') Component)

The amount ratio of A1 component, A2 component, A3 component, A4 component used for the reaction described in above may be determined accordingly; however from the point of the balance between the heat resistance, the adhesive strength, and the photochromic characteristics (the color optical density, the color fading speed, the weather resistance or so) of the obtained soluble polyurethane-urea (A' component) resin, it is preferable to be the following amount ratio. That is, when the total mol numbers of the hydroxyl group included in A1 component is n1, the total mol numbers of isocyanate group included in A2 component is n2, the total mol number of amino group included in A3 component is n3, and the total mol number of the groups capable of reacting with the isocyanate group (specifically, amino group, hydroxyl group, mercapto group and/or carboxyl group, etc.) is n4; then the weight ratio satisfy n1:n2:n3:n4=0.30 to 0.89:1:0.10 to 0.69:0.01 to 0.20, particularly n1:n2:n3:n4=0.40 to 0.83:0.15 to 0.58:0.02 to 0.15 is preferable, and n1:n2:n3:n4=0.55 to 0.78:1:0.20 to 0.43:0.02 to 0.10 is most preferable. Here, the above-described n1 to n4 can be obtained as the product of used mol number of the compound used for each component and the number of each group present in one molecule of said compound.

It is preferred that the A' component used in the present invention does not have a reactive group at a terminal end. It is especially preferred that the A' component is deactivated so that isocyanate group does not remain at the terminal end. Consequently, during production, it is preferred to produce A' component in a blending ratio of n2=n1+n3+n4. If the total mol number of n1, n3, and n4 (n1+n3+n4) is larger than n2, unreacted A1, A3, and A4 components may be removed by reprecipitation and the like. Further, if the total mol number of n1, n3, and n4 is larger than n2, a reaction terminator (A5 component), which is described in detail below, can be used for that difference (n2−(n1+n3+n4)).

A5 Component: Reaction Terminator

When the isocyanate group remain at the terminal end of the polyurethane-urea resin obtained by reacting A1, A2, A3, and A4 components based on the above-described method described as the synthesis method of A' component, the terminal end can be made inactive by adding a reaction terminator having an active hydrogen that reacts with the isocyanate groups. Further, the terminal end can also be made inactive by using A5 component instead of A4 component. Although it is acceptable for isocyanate group to remain at the terminal end, in such a case, deterioration in quality, such as gelation, or changes to the physical properties, can occur due to a high molecular weight component, for example, being produced as a result of moisture contamination and the like during storage. Whether isocyanate group still remain can be determined by measuring the infrared absorption spectrum.

A5 component of the present invention is a reaction terminator having a group capable of reacting with one isocyante group in the (A5) molecule in order to react with a polyurethane-urea resin having an isocyanate group at a terminal end.

As the group capable of reacting with said isocyanate group, amino group ($-NH_2$, and $NH(R)$), hydroxyl group (—OH), mercapto group (—SH:thiol group), carboxyl group [—C(═O)OH], or acid chloride group [—C(═O)OCl]can be mentioned.

This terminator comprise, in the molecule, only one group capable of reacting with the isocyanate group. If two or more of the group capable of reacting with the isocyanate groups are present in the molecule, the polyurethane-urea resin becomes high molecular weight, and becomes to obtain high viscosity when diluting with the organic solvent; hence it becomes difficult to form the film. By introducing said terminator at the terminal end of the polyurethane-urea resin, it becomes possible to control the number average molecular weight of the polyurethane-urea resin, and the adhesion and the heat resistance can be easily controlled to the physical properties of the object.

As for the terminator, amine, alcohol, thiol and carboxylic acid can be used. Specifically, normal butyl amine, sec-butyl amine, tert-butyl amine, dibutyl amine, diisopropyl amine, methanol, ethanol, isopropanol, normal butanol, so-butanol, tert-butanol, acetic acid or so may be mentioned.

Also, by using the functionalization compound which is A4 component mentioned in above as the terminator, the functionalization compound can be introduced into the polyurethane-urea resin and also at the same time, the terminal end of the isocyanate group can be made inactive.

Hereinbelow, the terminator which can be suitably used in the present invention will be described.

The preferable compound as the terminator can be indicated by the following general formula (8) and (9).

[Chemical Formula 8]

(8)

(in the above formula, $R^{39}$ is alkyl group having carbon atoms of 1 to 20, aryl group, aralkyl group, alkyloxycarbonyl group or hydrogen atom, $R^{40}$ is alkyl group having carbon atoms of 1 to 20, aryl group, aralkyl group, or ester group.)

In case $R^{39}$ uses the compound which is the hydrogen atom as A5 component, the terminal end of the polyurethane-urea resin becomes —NH($R^{40}$), however this —NH($R^4$) substantially does not react with other polymers, and other isocyanate compounds. Therefore, —NH($R^{40}$) is not considered as the group capable of reacting with the isocyanate group.

In the above general formula (8), $R^{39}$ is alkyl group having carbon atoms of 1 to 20, aryl group, aralkyl group, alkyloxycarbonyl group or hydrogen atom. Among these, $R^{39}$ is preferably alkyl group having carbon atoms of 1 to 10, aryl group, aralkyl group, alkyloxycarbonyl group or hydrogen atom. Said aryl group and aralkyl group may have an alkyl group having carbon atoms of 1 to 5, halogen atom as the substituent group.

As examples of suitable $R^{39}$, methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group, or hydrogen atom or so may be mentioned.

Also, $R^{40}$ is alkyl group having carbon atoms of 1 to 20, aryl group, aralkyl group, or alkyloxycarbonyl group. Among these, $R^{40}$ is preferably alkyl group having carbon atoms of 1 to 10, aryl group, aralkyl group, or alkyloxycarbonyl group. Said aryl group may comprise the alkyl group having carbon atoms of 1 to 5, and halogen atom as the substituent group.

As examples of suitable $R^{40}$, methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group or so may be mentioned.

Following general formula (9)
[Chemical formula 9]

(9)

(in the above formula, $R^{41}$ is alkyl group of carbon atoms of 1 to 20, aryl group, aralkyl group or alkyloxycarbonyl group, Z is hydroxyl group, carboxyl group, or thiol group.)

The above shown compound can also be suitably used as the terminator.

In the above general formula (9), $R^{41}$ is alkyl group of carbon atoms of 1 to 20, aryl group, aralkyl group or alkyloxycarbonyl group; and preferably it is alkyl group having carbon atoms of 1 to 10, aryl group, aralkyl group, or alkyloxycarbonyl group. This aryl group and aralkyl group may have alkyl group having carbon atoms of 1 to 5, and halogen atom as the substituent group. As for the preferable groups, alkyl group having carbon atoms of 1 to 5, phenyl group, and phenyl group having halogen atoms or so may be mentioned.

As examples of suitable $R^{41}$, methyl group, ethyl group, normal propyl group, isopropyl group, normal butyl group, tart-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group or so may be mentioned.

Z in the above general formula (9) is the group capable of reacting with the isocyanate group present at the terminal and of the polyurethane-urea resin, and specifically it is hydroxyl group, carboxyl group or thiol group; and preferably it is hydroxyl group.

As the specific compounds shown by above described general formula (8) and (9); amines such as methylamine, ethylamine, propylamine, isopropylamine, n-butylamine, tert-butylamine, pentylamine, hexylamine, heptylamine, 4-heptylamine, octylamine, 1,1-dipropylbutylamine, phenylamine, benzylamine, dimethylamine, diethylamine, dipropylamine, diisopropylamine, dibutylamine, di-tert-butylamine, dipentylamine, dihexylamine, diheptylamine, dioctylamine, methylethylamine, methylbutylamine, methylpentylamine, methylhexylamine, methylheptylamine, methyloctylamine, ethylpropylamine, ethylbutylamine, ethylpentylamine, ethylhexylamine, ethylheptylamine, ethyloctylamine, propylbutylamine, isopropylbutylamine, propylpentylamine, propylhexylamine, propylheptylamine, propyloctylamine or so; alcohols such as methanol, ethanol, propanol, isopropanol, butanol, 2-butanol, tert-butyl alcohol, pentyl alcohol, hexyl alcohol, heptyl alcohol, octyl alcohol, nonyl alcohol, decanol, 2-decanol or so; thiols such as methane thiol, ethane thiol, 1-propane thiol, 2-propane thiol, 1-butane thiol, 2-butane thiol, propane thiol, hexane thiol, heptane thiol, octane thiol, dodecane thiol, 2-methyl-1-butane thiol, 2-methylpropane thiol, 3-methyl-2-butene thiol, 1,1-dimethylheptane thiol, cyclohexane thiol, cyclopentane thiol, benzene thiol, benzene methane thiol, 2,6-dimethylbenzene thiol or so; carboxylic acid groups such as acetic acid, propionic acid, lactic acid, pentanoic acid, hexanoic acid, heptanoic acid, octanoic acid, nonanoic acid, decanoic acid, dodecanoic acid or so may be mentioned.

The above mentioned terminator may be used alone or by combining two or more thereof.

The Blending Ratio of A5 Component

A5 component can be introduced into a terminal end of (A) the soluble polyurethane-urea resin by reacting based on the same method as for A4 component in the above-described synthesis method 1 (A' component having a functionalization compound at a terminal end). Consequently, in synthesis method 1, the whole amount of A4 component can be replaced with A5 component, or A4 component and A5 component can be used together.

Further, in synthesis methods 2 and 3, if $n2>n1+n3+n4$, it is preferred to use the following blending ratio. Namely, it is preferred to set so that $n2=n1+n3+n4+n5$, wherein n5 denotes the total mol number of the groups capable of reacting with the isocyanate group included in A5 component. However, an amount in which $n5>n2-(n1+n3+n4)$ may also be used. In this case, as long as an excess amount of A5 component does not have an adverse impact, that amount may be used as is, or the excess A5 component can be removed by purification, such as by reprecipitation, drying and the like.

Although the amount ratio of A1 component, A2 component, A3 component, A4 component, and A5 component may be appropriately determined, from the point of a balance between the heat resistance, adhesive strength and the like of the obtained A' component, and the ultimately obtained A component, an amount ratio like the following is preferred. When the sum of the total mol number n4 of the groups capable of reacting with the isocyanates included in A4 component and the total mol number n5 of the groups capable of reacting with the isocyanates included in A5 component is defined as n6 ($n6=n4+n5$), a preferred amount ratio is $n1:n2:n3:n6=030$ to $0.89/1/0.10$ to $0.69/0.01$ to $0.20$, especially preferred is an amount ratio of $n1:n2:n3:n6=0.40$ to $0.83/1/0.15$ to $0.58/0.02$ to $0.15$, and most preferred is an amount ratio of $n1:n2:n3:n6=0.55$ to $0.78/1/0.20$ to $0.43/0.02$ to $0.10$. If only A4 component is used in the above-described synthesis method 1, $n6=n4$, while if only A5 component is used, $n6=n5$.

(Purification of A' Component)

The soluble polyurethane-urea resin (A' component) obtained by reacting based on such synthesis method and blending ratio can be used as A' component is carried out with the after treatment, such as distillation of the solvent if needed, or dropping the poor solvent such as water or so thereby precipitate/filter the soluble polyurethane-urea resin (A' component), then carrying out drying or so, then it may be used as A' component, or it can be used as the photochromic composition of the present invention by keeping it dissolved in the reaction solvent. If the soluble polyurethane-urea resin (A' component) was produced under conditions of $n2<n1+n3+n4$, $n2<n1+n3+n5$, $n2<n1+n3+n6$, it is preferred to remove unreacted monomer components by reprecipitation.

(Preferred A' Component Properties)

In order for (A) the polyurethane-urea resin obtained by reacting with the below-described C component to exhibit excellent effects, (A') a soluble polyurethane-urea resin having the following structure is most preferred.

Namely, it is preferred that (A') the above-described soluble polyurethane-urea resin is the soluble polyurethane-urea resin having A4 component introduced into a terminal end described in synthesis method 1. Further, it is preferred that the A4 component introduced into a terminal end is a functionalization compound having a piperidine structure. In addition, it is most preferred that the component that is introduced into the terminal end is only A4 component (does not include A5 component).

In addition, from the point of allowing the reaction with C component to proceed efficiently, as well as the heat resistance, adhesive strength, photochromic characteristics (color optical density, color fading speed, weather resistance etc.) of the obtained polyurethane-urea resin (A component), the molecular weight of (A') component is preferably 5000 to 100000, especially preferably 8000 to 50000, and most preferably 10000 to 40000. The molecular weight of (A') the soluble polyurethane-urea resin was measured under the conditions described in Example 1, which is described in detail below.

Next, the polyisocyanate compound having at least two isocyanate groups in the molecule serving as C component of the present invention will be described.

C Component: Polyisocyanate Compound Having at Least Two Isocyanate Groups in the Molecule By including in A component of the present invention a product obtained by reacting (A') the above-described soluble polyurethane-urea resin and (C) the polyisocyanate compound having at least two isocyanate groups in the molecule, the adhesive (close-adhesion) strength of the below-described optical article can be further improved. Especially, perspiration resistance can be improved.

The polyisocyanate compound having at least two isocyanate groups in the molecule of the present invention is not particularly limited, as long as it can increase the molecular weight of (A) the above-described soluble polyurethane-urea resin, so that the tetrahydrofuran insoluble content of the obtained (A) polyurethane-urea resin is 20.0 to 90.0 wt %, the known compounds may be used for this polyisocyanate compound. Among those, it is preferred to use a compound having an isocyanate group bonded to a secondary carbon. These can be used alone or in combination of two or more thereof.

Specific examples include an isomer mixture of 4,4'-methylenebis(cyclohexylisocyanate), cyclobutane-1,3-diisocyanate, cyclohexane-1,3-diisocyanate, cyclohexane-1,4-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate, isocyanate compounds of these, a trimer of isophorone diisocyanate (an isocyanurate compound) and the like.

The isocyanate group included in said C component can be used in the condition being protected by a blocking agent. Examples of blocking agents that can be used include acid amides, lactams, acid imides, imidazols, ureas, oxime compounds and the like. Specific examples include acetanilide, amide acetate, $\epsilon$-caprolactam, a succinic imide, a maleic imide, dimethylpyrazole, thiourea, acetaldoxime, acetoneoxime, methylethylketoxime and the like.

The number of isocyanate groups included in C component is two or more. A polyurethane-urea resin (A component) having a cross-linked structure can be produced by reacting with A' component when forming the photochromic adhesive layer by having two or more isocyanate groups in the molecule of C component. Forming this cross-linked structure in A component enables the heat resistance of the polyurethane-urea resin (A component) to be improved, and makes it more difficult for cohesive failure to occur, which is thought to increase the effect of an improvement in adhesion. However, considering processability, and the viscosity, storage stability and the like of the obtained photochromic composition, the number of the isocyanate groups is preferably 2 to 3.

In the present invention, although the molecular weight of said C component is not particularly limited, it is preferably less than 1000. If the molecular weight of said C component is 1000 or more, the heat resistance of the obtained photochromic adhesive layer and the film strength tend to deteriorate. This is thought to be due to the number of bonds between the isocyanate group tending to increase when a C component having a large molecular weight is used. Consequently, for example, even if a cross-linked structure is formed, the distance between the cross-linking points lengthens, and heat resistance does not improve much, so that the adhesion is not sufficiently improved. Therefore, the molecular weight of the C component is preferably less than 1000, more preferably 800 or less, and most preferably 500 or less. As described above, it is preferred that this C component is not a polymer. Consequently, the molecular weight of said C component refers the molecular weight of the C component itself. The lower limit of the molecular weight of the C component is the molecular weight of that monomeric compound. Although the lower limit is not particularly limited, it may be 100.

The Blending Amount of C Component

The blending amount of C component in the photochromic composition of the present invention is, from the point of adhesion, heat resistance, and photochromic characteristics, preferably 4.0 to 20.0 parts by weight with respect to 100 parts by weight of A' component. If the blending amount of C component satisfies this range, it is easier to prepare so that the tetrahydrofuran insoluble content of the obtained A component is 20.0 to 90.0 wt %, so that the obtained photochromic composition exhibits excellent effects. In case the above blending amount is too little, the effect of improved adhesion and the heat resistance cannot be obtained sufficiently. In case it is too much, the adhesive layer obtained from said photochromic composition tends to change opaque, lower the adhesion, and lower the durability of the photochromic compound and the like. In order to improve the adhesion between the optical base material such as a plastic film, while maintaining the photochromic characteristics such as the color optical density or the durability, it is preferred to set the blending amount of C component at 6.0 to 17.5 parts by weight, and especially preferably 7.0 to 15.0 parts by weight, with respect to 100 parts by weight of A' component. At this stage, the ratio of the isocyanate group of C component is preferably 1.0 to 10.0 parts by weight, more preferably 1.5 to 6.0 parts by weight, and most preferably 2.0 to 5.0 parts by weight, with respect to 100 parts by weight of A' component. Here, the amount of the isocyanate group can be obtained from the molecular weight of C component, the number of the isocyanate group per molecule, and the molecular weight of the isocyanate group.

(A Component Obtained from A' Component and C Component)

The reason why excellent adhesion are exhibited by using A component that includes C component and the above-described A' component is thought to be as follows. A part of the isocyanate groups react with the urethane bond or the urea bond of A' component, whereby a cross-linked structure is formed having allophanate bond or biuret bond and the like. By reacting A' component and C component, a polyurethane-urea resin (A component) (component that has an increased molecular weight and is insoluble in tetrahydrofuran) having a cross-linked structure is obtained, whereby it is thought that the aggregation force of a photochromic adhesive layer formed by laminating said A component is improved, and the adhesion and the heat resistance are improved. Especially, high adhesion (adhesion between an optical sheet and said adhesive layer) can be maintained even after coming into contact with hot water, and even after the below-described perspiration resistance test is performed. This effect is better than that of when using the typical polyurethane resin of 2 liquid type.

In order to produce A component having such a cross-linked structure, it is preferred to use a polyisocyanate compound having an isocyanate group bonded to a secondary carbon. The advantages of using a polyisocyanate compound having an isocyanate group bonded to a secondary carbon are thought by the present inventors to be as follows. The cross-linking of A' component by C component of the present invention is thought to proceed in two steps, a heating reaction and a moist reaction. In the heating reaction, one of the isocyanate groups of a part of the polyisocyanate compound reacts with the urethane bond or the urea bond of A' component. Next, in the moist reaction (reaction in the presence of water), the remaining isocyanate group of the polyisocyanate compound bound to A' component and a part of the isocyanate group of the polyisocyanate compound that remain free are hydrolyzed by moisture to produce an amine, whereby it is thought that the cross-linking reaction proceeds.

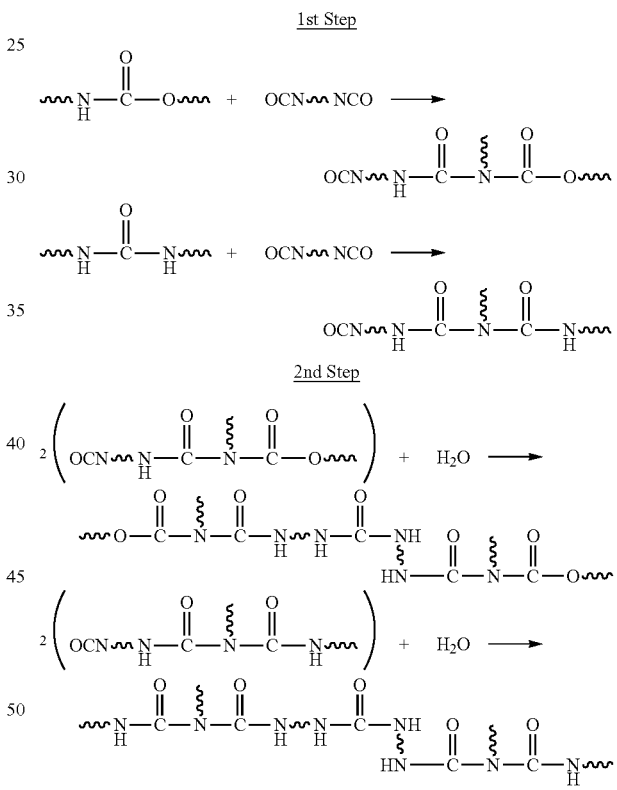

Further, in the above reaction formulae, the moieties indicated by a wavy line represents a polymer chain.

It is thought that since the isocyanate group bound to a secondary carbon has a comparatively slow rate of reaction, the amount bound to A' component and the amount that remains free are appropriately controlled, and as a result, a cross-linked structure tends to be formed.

Regarding the reaction between A' component and C component, it is thought that reactions like those described above proceed based on the following reasons. First, an isocyanate group peak is not observed for A' component in infrared absorption spectrum measurement. Next, a tetrahydrofuran insoluble content having an increased molecular weight can be confirmed in a product obtained by mixing A' component and C component and holding in a heated state in the presence of moisture (presence of water). Based on these reasons, it is thought that A' component and C component are reacting.

When A' component and C component are reacted, a tetrahydrofuran insoluble content is produced. A' component is soluble in tetrahydrofuran. It is thus thought that this tetrahydrofuran insoluble content corresponds to the reaction product of A' component and C component. This is backed up by measurement of gel permeation chromatography (GPC) using dimethylformamide as a solvent. It is preferred that A component dissolves in dimethylformamide. When this dissolved A component was measured by GPC, it was confirmed that A component included a higher molecular weight substance than A' component. Based on a comparison of GPC chromatograph peak tops, whereas a peak top molecular weight of preferred A' component was 100000 or less, for example, it was confirmed that A component obtained from such A' component was a high molecular weight substance having a peak top molecular weight on the high molecular weight side, for example, of 200000 or more. The ratio of this high molecular weight component is 5.0 to 50 wt %, and more preferably 10.0 to 40.0 wt %. The term high molecular weight component referred to here means all the regions that are newly seen in the polymer region in the A component compared with the GPC measurement results of A' component. The production amount of the high molecular weight component is the ratio of the high molecular weight component taken up by A component in all regions in the GPC measurement results.

Further, it was confirmed in the GPC chromatograph of A component that the low molecular weight component was less than in A' component. Although this does not provide complete proof; it is thought that the tetrahydrofuran soluble content also includes a reaction product of A' component and C component. An especially preferred A component has a peak top molecular weight of the high molecular weight component in GPC measurement of 200000 to 500000, and a peak top molecular weight of the low molecular weight component of 10000 to 100000. Further, in the present invention, the GPC measurement was carried out based on the conditions described in Example 1, which is described in detail below.

Moreover, if a reaction occurs only between C components, the obtained product is insoluble in tetrahydrofuran and dimethylformamide. Consequently, it was also confirmed that the tetrahydrofuran insoluble content in A component was not a product obtained from only C components.

As described above, it is thought that the tetrahydrofuran insoluble content (high molecular weight component) like that described above suggests that a cross-linked structure of allophanate bond or biuret bond and the like is formed by the isocyanate group included in C component reacting with the urethane bond or the urea bond included in A' component. FIG. 1 is a GPC chart of the A' component used in Example 1 and the A component of Example 1 obtained by cross-linking of said A' component.

From the point of the properties of the multilayer sheet obtained by adhering the optical sheets or films with each other using the photochromic composition of the present invention, the point of processing stability when producing an optical article by performing bending processing or injection molding using the obtained multilayer sheet, the point of the adhesion of such a multilayer sheet, and the point of the processability when coating or curing a hard coat liquid in case of forming the hard coat layer on the surface of such a multilayer sheet or optical article, it is preferred that A component, which includes a reaction product of A' component and C component, has a heat resistance of usually 60 to 200° C., and especially 80 to 150° C. The term "heat resistance" referred to here means the softening point measured under the following conditions using a thermomechanical measurement apparatus (TMA120C, made by Seiko Instruments, Inc.). (Measurement conditions) Temperature raising speed: 10° C./min; measuring temperature range: 30 to 200° C.; probe: probe with needle of tip diameter of 0.5 mm.

B Component: Photochromic Compound

The photochromic compound used as B component in the photochromic composition of the present invention may be any known photochromic compound, without restriction, such as a chromene compound, a fulgimide compound, a spirooxazine compound, and a spiropyran compound. These can be used alone or in combination of two or more thereof.

Examples of the above-mentioned fulgimide compound, spirooxazine compound, spiropyran compound, and chromene compound include the compounds described in, for example, Japanese Patent Laid-Open No. 2-28154, Japanese Patent Laid-Open No. 62-288830, WO94/22850, WO96/14596 and the like.

Particularly, as for chromene compounds other than those described in the above listed patent articles, the chromene compound having excellent photochromic characteristics is known and such chromene compounds can be suitably used as B component. As such chromene compounds, JP Patent Application Laid Open No. 2001-031670, JP Patent Application Laid Open No. 2001-011067, JP Patent Application Laid Open No. 2001-011066, JP Patent Application Laid Open No. 2000-344761, JP Patent Application Laid Open No. 2000-327675, JP Patent Application Laid Open No. 2000-256347, JP Patent Application Laid Open No. 2000-229976, JP Patent Application Laid Open No. 2000-229975, JP Patent Application Laid Open No. 2000-229974, JP Patent Application Laid Open No. 2000-229973, JP Patent Application Laid Open No. 2000-229972, JP Patent Application Laid Open No. 2000-219678, JP Patent Application Laid Open No. 2000-219686, JP Patent Application Laid Open No. H11-322739, JP Patent Application Laid Open No. H11-286484, JP Patent Application Laid Open No. H11-279171, JP Patent Application Laid Open No. H09-218301, JP Patent Application Laid Open No. H09-124645, JP Patent Application Laid Open No. H08-295690, JP Patent Application Laid Open No. 08-176139, JP Patent Application Laid Open No. H08-157467, U.S. Pat. No. 5,645,767, U.S. Pat. No. 5,658,501, U.S. Pat. No. 5,961,892, U.S. Pat. No. 6,296,785, JP Patent No. 4424981, JP Patent No. 4424962, WO2009/136668 pamphlet, WO2008/023828 pamphlet, JP Patent No. 4369754, JP Patent No. 4301621, JP Patent No. 4256985, WO2007/086532 pamphlet, JP Patent Application Laid Open No. 2009-120536, JP Patent Application Laid Open No. 2009-67754, JP Patent Application Laid Open No. 2009-67680, JP Patent Application Laid Open No. 2009-57300, JP Patent No. 4195615, JP Patent No. 4158881, JP Patent No. 4157245, JP Patent No. 4157239, JP Patent No.

4157227, JP Patent No. 4118458, JP Patent Application Laid Open No. 2008-74832, JP Patent No. 3982770, JP Patent No. 3801386, WO2005/028465 pamphlet, WO2003/042203 pamphlet, JP Patent Application Laid Open No. 2005-289812, JP Patent Application Laid Open No. 2005-289807, JP Patent Application Laid Open No. 2005-112772, JP Patent No. 3522189, WO2002/090342 pamphlet, JP Patent No. 3471073, JP Patent Application Laid Open No. 2003-277381, WO2001/060811 pamphlet, WO00/71544 pamphlet or so are disclosed.

Among these other photochromic compounds, from the point of the photochromic characteristics such as the color optical density, the initial coloring, the durability, the color fading speed or so, it is preferable to use one or more of the chromene compounds comprising indeno(2,1-f)naphto-(2,1-b) pyran structure. Further, among these chromene compounds, the compounds having the molecular weight of 540 or more is suitable as it exhibits particularly excellent color optical density and color fading speed.

Such chromene compounds can be shown by the following general formula.

[Chemical formula 11]

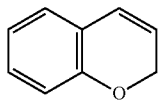
(10)

The chromene compounds having the structure shown by said general formula (10) is not particularly limited for the substituent group thereof, and it may have known substituent group.

As mentioned in the above, among these chromene compounds, from the point of the photochromic characteristics such as the color optical density, the initial coloring, the durability, the color fading speed or so, it is further preferably a chromene compounds comprising indeno(2,1-f)naphto-(2, 1-b) pyran structure as shown by the following general formula (11).

[Chemical formula 12]

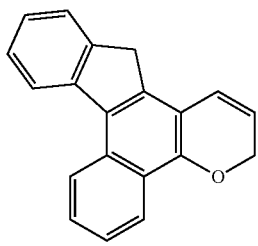
(11)

The chromene compounds comprising the structure shown by said general formula (11) is not particularly limited for the substituent group thereof, and it may comprise known substituent group.

[Chemical formula 13]

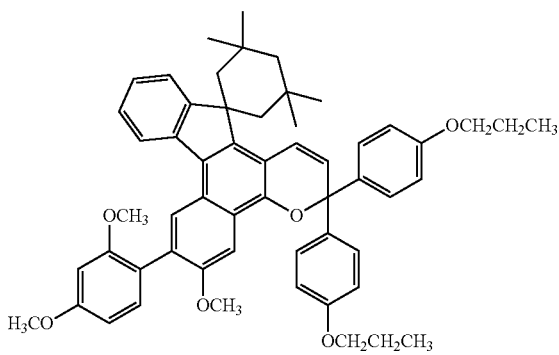
(1)

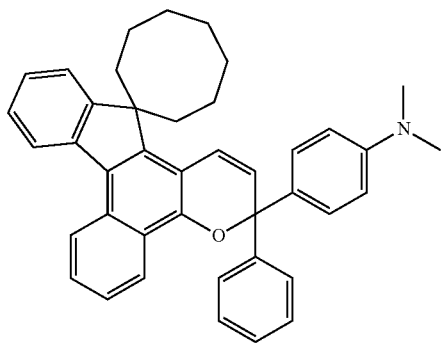
(2)

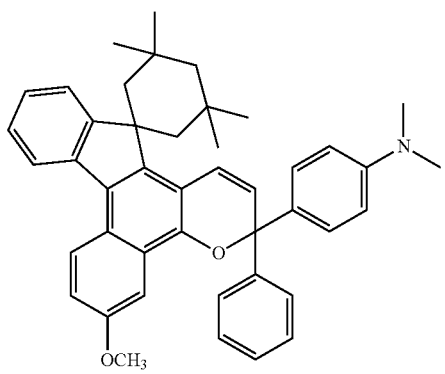
(3)

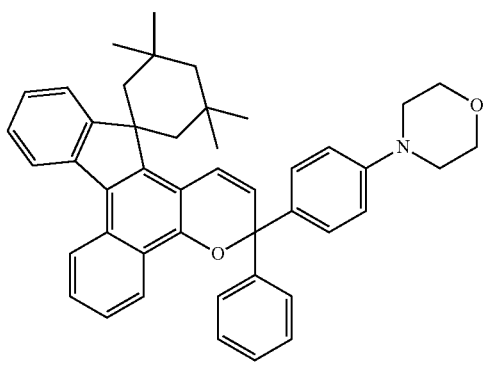
(4)

(5)
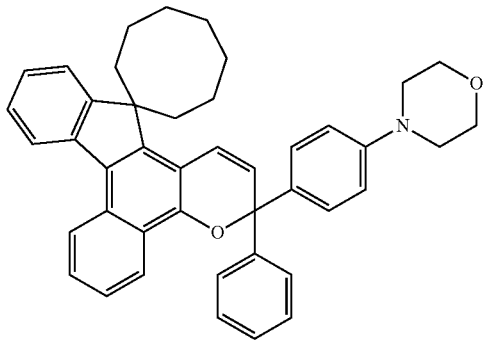

(6)
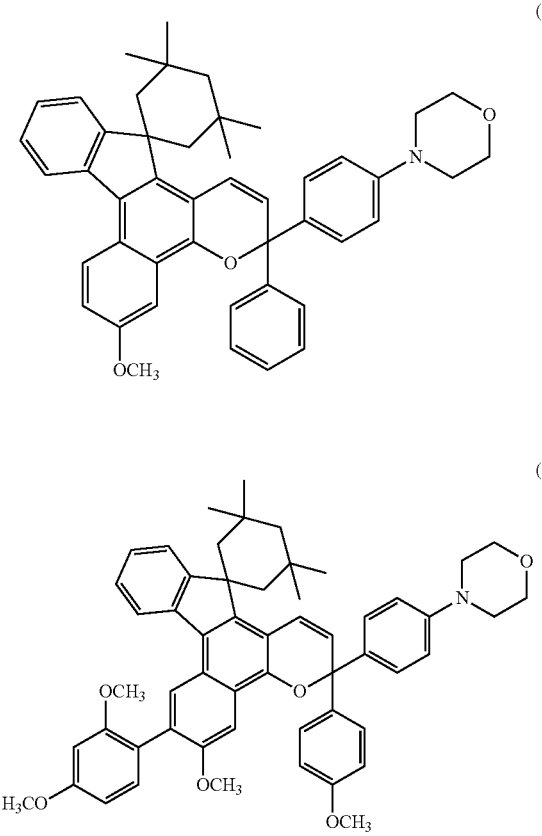

(7)

(8)
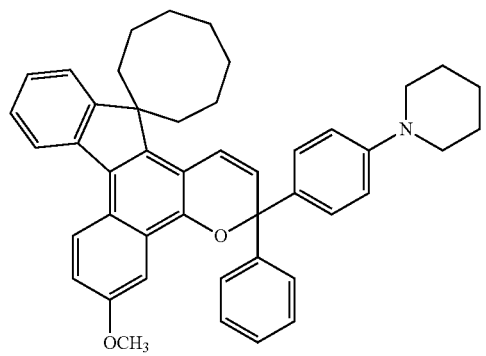

(9)
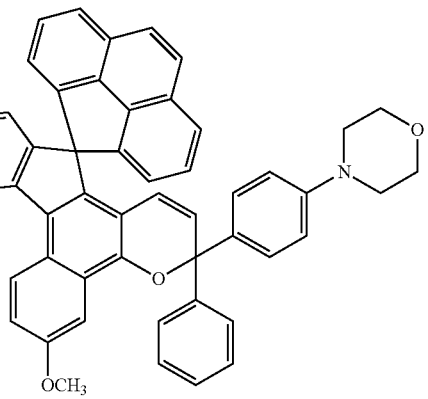

The blending amount of B component in the photochromic composition of the present invention is suitably 0.1 to 20.0 parts by weight with respect to 100 parts by weight of A component from the point of the photochromic characteristic. In case the above mentioned blending amount is too small, sufficient color optical density or durability tends to be difficult to obtain, and when it is too much, although it depends on the type of the photochromic compound, the photochromic compositions becomes difficult to dissolve which not only causes the uniformity of the composition to decline, but also the bonding force (the adhesive force) tends to decline. In order to maintain the photochromic characteristics such as the color optical density or the durability or so while sufficiently maintaining the adhesion between the optical base material such as plastic film or so, the added amount of B component is preferably 0.5 to 10.0 parts by weight and more preferably 1.0 to 7.0 parts by weight with respect to 100 parts by weight of A component.

However, when producing A component by reacting A' component and C component, rather than mixing B component in the obtained A component, it is preferred to blend B component during production of A component. Consequently, when producing A component by reacting A' component and C component, it is preferred to set the blending amount of B component to 0.1 to 20.0 parts by weight, more preferably 0.5 to 10.0 parts by weight, and even more preferably 1.0 to 7.0 parts by weight, with respect to 100 parts by weight of A' component.

The Other Components

Further, in the photochromic composition used for the present invention, for the improvement of the durability of the photochromic compound, the improvement of the color optical density, the improvement of the color fading speed or the film forming property; a solvent which can dissolve A component, the surfactant, the antioxidant, the radical capturing agent, the ultraviolet stabilizer, the ultraviolet absorbing agent, the releasing agent, the coloration inhibitor, the antistatic agent, the fluorescent die, the coloring dye, the pigment, the aromatic agent, the plasticizer or so may be added. As for these additives which are added, the known compounds are used without any limitations.

Examples of solvents that can dissolve A component include dimethylformamide, dimethylsulfoxide and the like.

For example, as the surfactant, any of nonionic, anionic, cationic can be used, however it is preferable to use nonionic surfactants from the point of the solubility to the photochromic compositions. As the specific nonionic surfactant able to be used suitably, sorbitan fatty acid ester, glycerin fatty acid ester, decaglycerin fatty acid ester, propylene glycol/pentaerythritol fatty acid ester, polyoxyethylene sorbitan fatty acid ester, polyoxyethylenesorbitan fatty acid ester, polyoxyethyleneglycerin fatty acid ester, polyethyleneglycol fatty acid ester, polyoxyethylenealkylether, polyoxyethylenephytosterol/phiytostanol, polyoxyethylenepolyoxypropylenealkylether, polyoxyethylenealkylphenylether, polyoxyethylene caster oil/curable caster oil, polyoxyethylenelanoline/lanorine alcohol/beeswax derivatives, polyoxyethylenealkylamine/fatty acid amine, polyoxyethylenealkylphenylformaldehyde condensation product, single chain polyoxyethylenealkylether, and further the surfactant of silicones or fluorine can be mentioned.

For the use of the surfactant, it may be used by mixing two or more thereof. The added amount of the surfactant is preferably within the range of 0.001 to 5 parts by weight with respect to 100 parts by weight of A component.

Also, as the antioxidant, the radical capturing agent, the ultraviolet stabilizer, and the ultraviolet absorbing agent, the hindered amine photo stabilizer, the hindered phenol antioxidant, the phenol radical capturing agent, the sulfur antioxidant, the phosphorous antioxidant, the triazine compounds, the benzotriazol compounds, the benzophenone compounds or so can be suitably used. These antioxidant, radical capturing agent, ultraviolet stabilizer, ultraviolet absorbing agent may be used by combining two or more thereof. Further, for the use of these additives, the antioxidant, the radical capturing agent, the ultraviolet stabilizer and the ultraviolet absorbing agent, and the surfactant may be used together. The added amount of these antioxidant, radical capturing agent, ultraviolet stabilizer, ultraviolet absorbing agent is preferably within the range of 0.001 to 20 parts by weight with respect to 100 parts by weight of A component. Note that, if these additives are used too much, the adhesion of the photochromic composition to the optical sheet or film made of polycarbonate resin declines, thus the added amount is preferably 7 parts by weight or less, more preferably 3 parts by weight or less, and most preferably 1 part by weight or less.

The Production Method of Photochromic Composition

The photochromic composition of the present invention can be produced by mixing above mentioned A component, B component, and other component. The order of mixing of each component is not particularly limited.

For example, each component can be melt kneaded and the photochromic composition can be made into a pellet, and also it can be sheet molded. Also, in case of using the organic solvent such as dimethylformamide, the photochromic composition can be obtained by dissolving each component to the organic solvent.

The photochromic composition of the present invention obtained as such can be suitably used as the photochromic adhesive agent for adhering the optical sheet or film made of photochromic adhesive agent, particularly made of polycarbonate resin. Further, by binding the optical sheets or films with each other via the adhesive layer consisting of the photochromic composition of the present invention, the optical article can be obtained.

Among the above-described production methods, since the photochromic composition of the present invention includes a component that does not dissolve in common organic solvents, for example, tetrahydrofuran, it is preferred to produce the inventive photochromic composition based on a method such as the following.

Namely, a production method of a photochromic composition including (A) said polyurethane-urea resin and (B) said photochromic compound by mixing 100 parts by weight of (A') said soluble polyurethane-urea resin having a urea bond in the molecular chain and that is soluble in tetrahydrofuran, 0.1 to 20 parts by weight of (B) said photochromic compound, 4.0 to 20.0 parts by weight of (C) said polyisocyanate compound, and 100 to 900 parts by weight of (D) an organic solvent, and then drying to remove the organic solvent, while reacting (A') said soluble polyurethane-urea resin and (C) said polyisocyanate compound.

The composition including A' component, B component, C component, and (D) an organic solvent (hereinafter it may be referred to as "D component") may be used as a precursor composition. This precursor composition can be produced by mixing A' component, B component, C component, and D component. This said precursor composition can also blend the above-described "other components".

In said method, the photochromic composition of the present invention can be produced by reacting A' component and C component to produce A component. In order to produce the photochromic composition from the precursor composition, for example, it is preferred to react (A') said soluble polyurethane-urea resin and (C) said polyisocyanate compound when coating the precursor composition on the base material and then drying to remove the organic solvent. First, the organic solvent (D component) will be described.

D Component: Organic Solvent

By using an organic solvent, the soluble polyurethane-urea resin (A' component), the polyisocyanate compound (C component), the photochromic compound (B component), and even the optionally-added other components can be mixed more easily, and the uniformity of the precursor composition can be improved. Further, the viscosity of the precursor composition can be adjusted appropriately, and the processability and the evenness of the thickness of the coated layer when coating the precursor composition on an optical sheet or film can be further enhanced. Note that when a material that is easily affected by organic solvents is used as the optical sheet or film, the appearance may be harmed, or photochromic characteristics may deteriorate. However, however such problems can be avoided by employing the following method. In addition, in the precursor composition, as described below, since various types of solvent can be used, the above problems can be prevented by selecting and using a solvent that tends not to affect the optical sheet or film.

Examples of organic solvents that can be preferably used as D component include alcohols such as methanol, ethanol, n-propanol, i-propanol, 2-pentanol, 3-pentanol, 3-methyl-2-butanol, 4-methyl-2-pentanol, n-butanol, t-butanol, 2-butanol, and t-pentyl alcohol 2,2,2-tri fluoroethanol; polyvalent alcohol derivatives such as ethylene glycol monomethyl ether, ethylene glycol monoisopropyl ether, ethylene glycol monoethyl ether, ethylene glycol mono-n-propyl ether, etheylene glycol mono-n-butyl ether, ethylene glycol mono-t-butyl ether, propylene glycol monomethyl ether, propylene glycol monoethyl ether, propylene glycol-n-butyl ether, and ethylene glycol dimethyl ether; diacetone alcohol; ketones such as methyl ethyl ketone, diethyl ketone, n-propyl methyl ketone, methyl isobutyl ketone, diisopropyl ketone, and n-butyl methyl ketone; toluene; hexane; heptane; acetates such as ethyl acetate, acetate-2-methoxyethyl, and acetate-2-ethoxyethyl; dimethylformamide (DMF); dimethylsulfoxide (DMSO); tetrahydrofurane (THF); cyclohexane; chloroform; dicyclomethane and combinations thereof.

From among these, although the organic solvent may be appropriately selected based on the type of A' component that is used and the properties of the optical film or sheet, since the polyisocyanate compound (C component) is included in the precursor composition, it is more preferred to use an organic solvent that does not include a group that reacts with the isocyanate group. Therefore, examples of more suitable organic solvents include, from the point of solubility of A' component and not reacting with C component, ketones such as methyl ethyl ketone, diethyl ketone, n-propyl methyl ketone, methyl isobutyl ketone, diisopropyl ketone, and n-butyl methyl ketone, acetates such as ethyl acetate, 2-methoxyethyl acetate, and 2-ethoxyethyl acetate; DMF; DMSO; THF; cyclopentanone and cyclohexanone; chloroform; dichloromethane and the like.

Further, to coat the exterior well and to volatilize the organic solvent in a short period of time, it is important to increase the solid content concentration as well as to reduce the viscosity. In order to improve solubility, it is preferred to use an organic solvent like those described above. However, to reduce the viscosity, it is preferred to use a protic organic solvent, such as an alcohol. Among those, considering reactivity with the isocyanate group of the polyisocyanate compound (C component), a secondary or a tertiary alcohol is preferred, and a tertiary alcohol is more preferred. Examples of preferred secondary alcohols include i-propanol, 2-butanol, 2-pentanol, 3-pentanol, 3-methyl-2-butanol, 4-methyl-2-pentanol, propylene glycol monomethyl ether, propylene glycol monoethyl ether, and propylene glycol-n-butyl ether. Examples of preferred tertiary alcohols include t-butanol and t-pentyl alcohol. These secondary or tertiary alcohols can be used alone or as a mixture of two or more thereof.

However, in some cases the soluble polyurethane-urea resin (A' component) of the present invention may not easily dissolve in the above-described secondary or tertiary alcohols. Therefore, it is preferred to combine the secondary or tertiary alcohol with a good solvent such as an above-described ketones. Using ketones that are a good solvents in combination with the secondary or tertiary alcohol enables the viscosity of the precursor composition to be reduced while maintaining the solubility of the A' component. Further, when combining two or more kinds of these organic solvents, it is preferred to combine so that the boiling point of the good solvent is a higher temperature than the boiling point of the secondary or tertiary alcohol.

The blending ratio of the secondary or tertiary alcohol in D component is preferably set to have a mass ratio ((mass of the secondary or tertiary alcohol)/(mass of the ketones)) with respect to the ketones that are good solvents of 0.10 to 1.50, more preferably 0.15 to 1.00, and most preferably 0.20 to 0.70. If a plurality of types of alcohol are used, the above blending ratio is calculated based on the total amount of the alcohols. If the blending ratio of the secondary or tertiary alcohol satisfies the range of 0.10 to 1.50, the solubility of the A' component is high, reactions between the organic solvent and the isocyanate group of C component are suppressed, and the viscosity of the precursor composition can be reduced.

Further, for the reasons that less organic solvent remains and the drying rate can be increased while maintaining the smoothness of the coated layer when the precursor composition is coated on a base material such as an optical sheet or film, or of the photochromic adhesive sheet produced when the following method is employed, it is preferred to use as D component a mixture of an organic solvent having a boiling point of less the 90° C. and an organic solvent having a boiling point of 90° C. or more. The blending ratio of the organic solvent having a boiling point of less than 90° C. and an organic solvent having a boiling point of 90° C. or more may be appropriately determined based on the other component that are used. Among those, to exhibit excellent effects, based on a total organic solvent amount of 100 wt %, it is preferred to set the ratio of the organic solvent having a boiling point of less than 90° C. to 20 to 80 wt %, and the ratio of the organic solvent having a boiling point of 90° C. or more to 80 to 20 wt %.

In addition, from the point of the effects obtained by the blending of such a D component, the blending amount of D component is preferably 100 to 900 parts by weight, more preferably 120 to 900 parts by weight, and most preferably 150 to 700 parts by weight, with respect to 100 parts by weight of A' component.

In the present invention, it is preferred to produce the photochromic composition from said precursor composition. Consequently, to efficiently react A' component and C component, water can be blended to the precursor composition.

Next, the water will be described.

Water

The precursor composition can be blended with water. Particularly, by blending the precursor composition including C component, which is a polyisocyanate compound, with water, the isocyanate group included in C component can be hydrolyzed (reacted) efficiently. This water can be blended to the precursor composition from the beginning. However, considering the storage stability of the precursor composition, it is preferred to blend it when the precursor composition is used, namely, when a coated film is to be formed with said composition and an optical sheet adhered. Further, although described in more detail below, when forming a photochromic adhesive sheet, this water may be substituted with the moisture that is present in the atmosphere. The hydrolysis of the isocyanate group included in C component also proceeds due to the isocyanate group coming into contact with the water (moisture) in the environment after the coated film is formed by coating the precursor composition on the optical sheet.

The blending amount of water is not particularly limited, and can be set according to the moisture in the environment, which will be described in detail below. A preferred blending amount is with the range of 0.01 times to 5 times, more preferably 0.05 times to 3 times, and even more preferably 0.1 times to 2 times the mol number of the isocyanate groups included in C component.

The photochromic composition of the present invention can be produced by preparing said precursor composition, coating said precursor composition on a base material, removing the organic solvent, while reacting A' component and C component.

The photochromic composition of the present invention obtained by a method like that described above, as well as a method in which the precursor composition is used, can be preferably used as a photochromic adhesive, especially as a photochromic adhesive for bonding together optical sheets or films made from a polycarbonate resin. Further, by bonding together optical sheets or films via an adhesive layer formed from the photochromic composition of the present invention, a multilayer sheet, and even an optical article, can be obtained. Hereinafter, the optical article and a production method thereof will be described.

Optical Article

The optical article has the multilayer structure wherein two optical sheets or films opposing each other are bound via the adhesive layer consisting of the photochromic composition of the present invention. As for such optical article; the multilayer sheet or film formed only by the above mentioned multilayer structure (hereinafter, it may be simply referred as the multilayer sheet); the multilayer sheet or film wherein two optical sheets or films are bound via other adhesive sheet at both sides of the adhesive layer consisting of the photochromic composition when forming the above mentioned multilayer structure; the multilayer sheet or film in which the optical sheet or film is further laminated or the coating layer such as hard coat layer or so are formed on the above mentioned multilayer sheet or film; the optical article wherein the optical base material such as plastic lens body or so are made one body with the above mentioned multilayer sheet or film, or the complex multilayer sheet (hereinafter, it may be simply referred, as a whole, the multilayer sheet or so of the present invention.) or so may be mentioned.

In the multilayer sheet of the present invention, it is possible to produce the multilayer sheet or film by laminating other adhesive layers (hereinafter, it may be referred as the second adhesive layers) at both sides of the adhesive layer (hereinafter, it may be referred as the first adhesive layer) consisting of the photochromic composition as mentioned in above; then binding two optical sheets or films via said second adhesive layers.

By laminating the second adhesive layer, the adhesion of the multilayer sheet of the present invention can be further improved. As for the reason of the improvement of the adhesion of the multilayer sheet of the present invention by laminating the second adhesive layer, the following two points can be mentioned.

First, the layer comprising the compound of which easily under goes photooxidative degradation such as the photochromic composition is prevented from directly contacting with the optical sheet or film. The reason for this is not necessarily clear, however it is thought that the photochromic composition which was made to low molecular weight by being degraded from the photooxidative degradation enters to the interface between the adhesive layer and the optical sheet or film; thereby the adhesion of the both are thought to be lowered.

Second, although it exhibits the effect particularly against the optical sheet or film consisting of thermoplastic resin, by directly coating the adhesive agent having a fluidity at the liquid condition such as before curing or being dissolved in the organic solvent, to the optical sheet or the optical film; the optical sheet or the optical film can be immersed in the adhesive agent and permeate again; thus the adhesive strength is thought to be improved.

Therefore, the second adhesive layer used in the present invention preferably does not have the photochromic compound, and further preferably it is directly coated to the optical sheet or the optical film in the condition of the adhesive agent having fluidity under the liquid status.

It is preferred to use a polyurethane-urea resin similar to A' component for the component used for the second adhesive layer of the present invention. Especially, by using a polyurethane-urea resin in which the below-described softening point, surface free energy, solubility parameter and the like have been controlled, a stronger close-adhesion force with the first adhesive layer having the photochromic compound of the present invention, and the optical sheet or film, can be obtained. Hereinafter, the polyurethane-urea resin (E component) used in the second adhesive layer will be described.

E Component: Polyurethane-Urea Resin Used for the Second Adhesive Layer

E component of the present invention is a similar polyurethane-urea resin to A' component. The components A1, A2, A3, A4, and optionally A5 described as the constituent elements of A' component can be used as is. The synthesis method too can also be carried out in the same manner as for A' component. Further, component A5 can also be used instead of, of together with, component A4.

Especially when the isocyanate sheet or film of the present invention is polycarbonate, it is preferred that E component has the following properties.

From the perspective of adhesion to the optical film or sheet and adhesion to the first adhesive layer, it is preferred that the polyurethane-urea resin for the second adhesive layer (E component) has a surface free energy in the range of 40.0 to 65.0 mJ/m$^2$. Although adhesive force improves the greater the surface free energy is, if the surface free energy is more than 65.0 mJ/m$^2$, the difference with the surface free energy of the polycarbonate of 46.4 mJ/m$^2$ becomes too large, which tends to cause surface tension to increase and adhesion to deteriorate. Further, if the surface free energy is less than 40.0 mJ/m$^2$, because the surface free energy itself is too small, adhesive force tends to deteriorate. From the perspective of adhesion, a more preferred surface free energy range is 50.0 to 58.0 mJ/m$^2$. The term "surface free energy" referred to here is the result of analysis based on the Kitazaki-Hata theory by performing contact angle measurement using an automatic contact angle meter (DM500, manufactured by Kyowa Interface Science Co., Ltd.). Further, three types of probe solution were used in contact angle measurement, water, ethylene glycol, and diiodomethane.

The above-described surface free energy can be adjusted by controlling the type and ratio of component A1, component A2, component A3, component A4, and component A5 used when synthesizing E component.

Further, from the perspective of adhesion to the optical film or sheet and adhesion to the first adhesive layer, it is preferred that E component has a solubility parameter (SP value) in the range of 7.0 to 12.0, and more preferably 8.0 to 10.7. If the solubility parameter is not within this solubility parameter range, the difference with the SP value of polycarbonate of 9.2 becomes too large, which tends to cause coating properties and adhesion to deteriorate. This solubility parameter can be adjusted by controlling the type and ratio of component A1, component A2, component A3, component A4, and component A5 used when producing E component.

The solubility parameter referred to here is a value calculated by the following equation, in which the molar attraction constant and the molar volume of the atomic groups were taken from the Adhesion Handbook (Third Ed., published 1996, P. 332, Table 4.3).

$$\text{Solubility parameter (SP value)} = \Sigma \Delta F / \Sigma \Delta v$$

ΔF: Atomic group molar attraction constant
Δv: Atomic group molar volume

Although it is preferred to use such E component, this E component may be produced using the same components (component A1, component A2, component A3, component A4, and component A5) and method as for the above-described A' component.

Preferred E Component Composition, Blending Amount, and Properties

E component can be produced from the component A1, component A2, component A3, component A4, and component A5 described for A' component.

Examples of a preferred component A1 used for E component include a polycarbonate having a number average molecular weight of 600 to 1,200 that uses a low-molecular-weight polyol, such as 1,4-butanediol, 1,5-pentanediol, 1,6-hexanediol, and 1,8-octanediol, as a starting material.

As a preferred component A2 used for E component, it is preferred to use an alicyclic diisocyanate compound. Specific examples include an isomer mixture of isophorone diisocyanate, norbornane diisocyanate, and 4,4'-methylenebis(cyclohexylisocyanate).

As a preferred component A3 used for E component, a diamine is preferred. Specific examples include isophorone diamine, bis-(4-aminocyclohexyl)methane, and norbornane diamine.

As a preferred component A4 used for E component, it is preferred to use a compound represented by the above formula 1. Specific examples include 1,2,2,6,6-pentamethyl-4-aminomethylpiperidine.

As a preferred component A5 used for E component, it is preferred to use a compound represented by the above formula 9. Specific examples include an alkyl amine such as normal-butyl amine.

Although the mixing ratio of each component may be determined as appropriate, from the perspective of a balance among the heat resistance, adhesive strength, surface free energy, solubility parameter and the like of the obtained E component, a mixing ratio like the following is preferred. Here, the definition of n1, n2, n3, and n6 (n6=n4+n5) is as described above. A preferred mixing ratio range is n1:n2:n3:n6=0.30 to 0.89/1/0.10 to 0.69/0.00 to 0.20. Further, in order for the obtained E component to exhibit even better close-adhesion properties, more preferred is n1:n2:n3:n6=0.40 to 0.80/1/0.15 to 0.58/0.00 to 0.15, and most preferred is n1:n2:n3:n6=0.51 to 0.68/1/0.30 to 0.48/0.01 to 0.10. Among these, it is preferred to set so that n2=n1+n3+n6. Considering long-term stability, it is preferred to make the ends inactive. In addition, if using E component whose ends have been made inactive, considering durability, it is preferred to use component A4. On the other hand, considering adhesion, it is preferred to use only component A5.

E component can be produced based on the synthesis method of A' component using a mixing ratio like that described above. In such a method, it is preferred that component A4 and/or component A5 is present on the ends. It is also preferred to employ synthesis method 1.

Further, regarding the other characteristics of E component, from the perspectives of heat resistance, adhesive strength and the like, it is preferred that E component has a molecular weight of 5,000 to 100,000, especially preferably 8,000 to 50,000, and most preferably 10,000 to 40,000. This molecular weight is a value measured under the conditions described in Example 1, which is described in detail below.

Further, from the perspective of the properties of the multilayer sheet obtained by pasting optical sheets or films together, the perspective of processing stability when producing an optical article by bending processing or injection molding using the obtained multilayer sheet, the perspective of the adhesion of such a multilayer sheet, and the perspective of processability when coating or curing a hard coat liquid when forming a hard coat layer on the surface of such a multilayer sheet or optical article, it is preferred that E component has a heat resistance of usually 60 to 200° C., and especially 100 to 150° C. The term "heat resistance" referred to here means a value obtained based on the same method as described in the above section "Component A obtained from A' component and C component".

Thickness of the Second Adhesive Layer and Method for Forming the Same

The second adhesive layer preferably has a thickness in the range of 2 to 40 µm, and more preferably 5 to 15 µm. If the thickness is thinner than 2 µm, adhesion tend to deteriorate, and if the thickness is more than 40 µm, organic solvent tends to remain. Further, the weather resistance (durability) of the photochromic composition also tends to deteriorate.

The adhesive (composition including E component) for forming the second adhesive layer may optionally include an organic solvent like that used for the first adhesive layer (above-described photochromic composition). However, if a thermoplastic resin such as polycarbonate is used for the optical sheet or film, it is preferred that the organic solvent used for the adhesive forming the second adhesive layer has a poor solubility with the thermoplastic resin. If the solubility with the thermoplastic resin is high, the thermoplastic resin can excessively dissolve, causing appearance defects (cloudiness), adhesive deterioration, and deterioration in the photochromic characteristics when laminating the first adhesive layer. Further, if the solubility with the thermoplastic resin is too low, the optical sheet or film does not dissolve, so that the adhesion with the second adhesive layer are not sufficiently exhibited. Therefore, as the organic solvent used in the second adhesive layer, it is preferred to use as a main solvent an alcohol, such as methanol, ethanol, n-propanol, i-propanol, n-butanol, t-butanol, and 2-butanol; a polyvalent alcohol derivative, such as ethylene glycol monomethyl ether, ethylene glycol monoisopropyl ether, ethylene glycol monoethyl ether, ethylene glycol mono-n-propyl ether, etheylene glycol mono-n-butyl ether, ethylene glycol mono-t-butyl ether, propylene glycol monomethyl ether, propylene glycol monoethyl ether, propylene glycol-n-butyl ether, and ethylene glycol dimethyl ether; or diaceto alcohol.

In addition, to further improve the adhesive (close-adhesion) strength of the optical article, the above-described C component used in the first adhesive layer may also be included. Further, to improve film forming properties and weather resistance, the surfactant, antioxidant, radical capturing agent, ultraviolet ray stabilizer, ultraviolet ray absorbing agent, dye and the like used in the first adhesive layer may also be included.

Next, the materials or parts forming the optical article of the present invention will be described.

Optical Sheet or Film

In the present invention, any sheet or film having optical transparency can be used without particular limitation as the optical sheet or film. However, it is preferred to use a sheet or film made of resin, as such materials are easy to obtain and easy to process. Examples of preferred resins as the starting material of the optical sheet or film include polycarbonate resin, polyethylene terephthalate resin, nylon resin, triacetyl cellulose resin, acrylic resin, urethane resin, allyl resin, epoxy resin, polyvinyl resin and the like. Among these, polycarbonate resin is especially preferable since it has good adhesion and high applicability in injection molding. Further, a polarizing film (a polyvinyl alcohol polarizing film sandwiched between triacetyl cellulose resin films), a polarizing sheet (a polyvinyl alcohol polarizing film sandwiched between polycarbonate sheets), a dyed film, and a dyed sheet can also be used as the optical sheet or film of the present invention. When using a dyed sheet or film, an already dyed product can be used, or the multilayer sheet of the present invention may be produced first, and then the optical sheet or film on the surface may be dyed.

When obtaining the optical article using the above-described polarizing film, polarizing sheet, dyed film, and dyed sheet, it is preferred to laminate the first adhesive layer on a layer that is above (on the side irradiated with sunlight or UV-rays) such a polarizing film and the like.

A preferred thickness of the optical sheet or film used in the present invention is 100 to 1,500 µm, and more preferably 200 to 1,000 µm. Further, such an optical sheet or film can also be used in a combination of different thicknesses.

Further, a coated film like those described below may be formed on the surface (top face and bottom face) of the optical sheet and film of the present invention. The coated film may be formed from resins, cross-linked products, and compositions, such as water-dispersible polymers such as a water-dispersible polyurethane resin, a water-dispersible polyester resin, a water-dispersible acrylic resin, and a water-dispersible polyurethane-acrylic resin; among water-dispersible polymers, a crosslinked product of a polymer having a carbonyl group and a hydrazide compound; a cross-linked product of a water-dispersible polymer such as a polyvinyl alcohol; a composition of a hydrolyzable organosilicon compound having a group selected from a polymerizable monomer having a (meth)acrylic group, and/or an epoxy group, a (meth)acryl group, a vinyl group, an amino group, and a mercapto group; a composition of a polyurethane-urea resin having a polymerizable group selected from a silanol group or a group capable of forming by a silanol group by hydrolysis, a (meth)acrylate group, an epoxy groups, and a vinyl group; an ene/thiol composition including a propenyl ether group-containing compound, a polyene compound, and a thiol compound, a photocurable composition including an oxetane compound and the like. By forming the coated layer especially on the topmost surface (the side on which the photochromic adhesive sheet is not present), the multilayer sheet of the present invention can be thoroughly embedded in a monomer composition forming the thermosetting resin (optical base material), such as a (meth)acrylate monomer composition, an allyl monomer composition, a thio-urethane monomer composition, a urethane monomer composition, and a thioepoxy monomer composition. Consequently, an optical article in which the multilayer sheet is embedded in such a thermosetting resin (optical base material) can be obtained that has good close-adhesion properties between the thermosetting resin (optical base material) and the multilayer sheet.

The Production Method of the Multilayer Sheet of the Present Invention

The multilayer sheet of the present invention is produced by binding two optical sheets or films facing each other via the adhesive layer consisting of the photochromic composition of the present invention. Note that, the thickness of the above mentioned first adhesive layer is 5 to 100 μm; more preferably it is 10 to 50 μm from the point of the color optical density, the weather resistance and the adhesive strength of the photochromic compound. Also, in case of using the second adhesive layer, the thickness thereof is preferably within the range of 2 to 40 μm, and more preferably 5 to 15 μm as mentioned in the above. From the perspectives of ease of production of the multilayer sheet and processability during the below-described processing, the thickness of the obtained multilayer sheet is preferably 500 to 3,000 μm.

The above mentioned first adhesive layer can be obtained from the following method depending on the property of the photochromic composition used. That is, in case the photochromic composition of the present invention is controlled to a suitable viscosity by blending the solvent or so, to the one of the optical sheet or film the photochromic composition (or the precursor composition) of the present invention is coated, and after carrying out the drying (heating) if needed, other optical sheet or film may be (heat) pressure adhered. A preferred viscosity of the photochromic composition (or precursor composition) of the present invention is, at 25° C., 2,000 to 60,000 cP, more preferably 5,000 to 50,000 cP, and even more preferably 10,000 to 40,000 cP. If the viscosity of the photochromic composition (or precursor composition) is 2,000 to 60,000 cP, the smoothness of the photochromic adhesive sheet can be increased, and by roll-to-roll coating, the occurrence of appearance defects such as vertical streaks or horizontal streaks can be suppressed.

Here, as for the coating method of the photochromic composition (or the precursor composition), the known methods such as a spin coat method, a spray coat method, a dip coat method, a dip spin coat method, a dry lamination method or so can be used without any limitation. Also, the optical sheet or film used in the present invention may be washed/degreased by the organic solvent such as methanol or so in advance. Further, a corona discharge treatment, a plasma discharge treatment, a UV ozone treatment or so can be carried out as well.

Further, as the coating machine used in coating, any coating common machine can be used without restriction, such as a knife coater, a die coater, a gravure coater, a reverse roll coater, a bar coater and the like. Among these, a knife coater and a die coater can be preferably used due to the comparatively wide coating viscosity range that they allow.

Also, in case of using the photochromic composition (or the precursor composition) of the present invention including the organic solvent, the (D) organic solvent is removed by (I) drying after casting the photochromic composition (or the precursor composition) of the present invention on the flat and smooth base material, then the photochromic adhesive sheet including A component (or A' component and C component) and B component dispersed in said A component (or A' component and C component) is formed by removing the base material, followed by (II) adhering two optical sheets or films by placing the above mentioned photochromic adhesive sheet in between two optical sheets or films facing each other; thereby the multilayer sheet of the present invention can be produced. Note that when a precursor composition is used, this means that the photochromic composition (photochromic adhesive sheet: first adhesive layer) is formed during the process of producing this multilayer sheet.

As for the material of the flat and smooth base material, those having the resistance to the solvent used in the present invention, or those which the photochromic composition (or the precursor composition) can be released easily are preferable, and for specific example, glass, stainless, Teflon, polyethylenetelephthalate, polypropylene, and the plastic film laminated with the coat layer which improves the releasability such as silicones or fluorines may be mentioned.

In case of employing such method, regardless of the type of the solvent and the type of the optical sheet or film, the adverse effect caused by the use of the solvent can be eliminated.

The coating and the drying of the above mentioned photochromic composition (or the precursor composition) is preferably carried out at the temperature of the room temperature to 130° C., the humidity of 10 to 100% RH. Since the organic solvent remains in the dried photochromic adhesive sheet, this can have an adverse impact on the photochromic characteristics. Therefore, it is preferred that the mass of the organic solvent after the drying is 0.1% or less based on the photochromic adhesive sheet. Further, when using a precursor composition, since a polyisocyanate compound is added to this precursor composition as C component, if operations such as coating and drying are carried out in an environment in which moisture is present, a hydrolysis reaction of the C component is promoted, so that a stronger close-adhesion force is obtained. By carrying out the drying under the above mentioned humidity (under the presence of the moisture), the photochromic adhesive sheet exhibiting an excellent property can be obtained without blending the water in the precursor composition. Also, in case of blending the water, said sheet can be formed under the drying condition.

The multilayer sheet obtained at the step of binding said optical sheets or optical films, it may be used as it is, however it can be used by stabilizing the condition thereof by the following method. Specifically, it is preferable to leave the multilayer sheet at the temperature of 20° C. or higher and 60° C. or less for 4 hours or longer and deaerating. The upper limit for the time for leaving is not particularly limited, however, 50 hours or so is sufficient. Also it can be left at normal pressure, or it can be left under vacuumed condition. Further, this multilayer sheet being left is preferably left at the temperature of 60° C. or higher and 130° C. or less for 30 minutes to 3 hours (hereinafter referred to as "heat treatment"). By performing this heat treatment, it is thought that a part of the isocyanate groups of the C component participate in the reaction. Consequently, these isocyanate groups bond to the urethane bonds or the urea bonds of the A' component, whereby it is thought the formation of allophanate bonds or biuret bonds is promoted. Further, the multilayer sheet obtained by this heat treatment is in a very stable state.

Further, when the precursor composition mixed with the C component is used, it is preferred that a humidification treatment is carried out at a temperature of from room temperature to 100° C. under a 30 to 100% RH environment. Carrying out this humidification treatment not only allows a cross-linked structure between components A' to be completed by C component, but all of the isocyanate groups derived from C component that are present in the multilayer sheet can be eliminated, so that the photochromic characteristics and the adhesion can be made more stable.

In addition, after the humidification treatment, by leaving to stand at ordinary pressure, or under a vacuum, at 40 to 130° C., excess moisture present in the multilayer sheet can be removed. Therefore, to obtain the A component of the present invention from the precursor composition, after producing the photochromic multilayer sheet, it is preferred to perform post-treatments in the order of 1) degassing, 2) a heat treatment, 3) a humidification treatment, and 4) moisture removal. It is preferred to form A component by reacting the A' component and C component in the coated first adhesive layer.

Also, as the method for producing the multilayer sheet comprising the aforementioned second adhesive layer, the production method thereof is not particularly limited as long as the embodiment has the lamination of the second adhesive layer between the first adhesive layer and the optical sheet or the optical film.

As for the production method, 1) the method of laminating the second adhesive layer on the optical sheet or the optical film in advance and sandwiching the first adhesive layer with two optical sheets or the optical films having this second adhesive layer;

2) the method of coating the second adhesive layers at both sides of the first adhesive layer then binding the optical sheet or the optical film at both sides thereof;

3) the method of sequentially laminating on the optical sheet or the optical film, so that it is in the order of the first adhesive layer, the second adhesive layer, the first adhesive layer and then optical sheet or the optical film; or so may be mentioned; however from the point of the production efficiency, it is most preferable to use the method 1).

As for the coating method and the drying method of the second adhesive layer of the present invention, it can be carried out as the same method as the first adhesive layer.

In addition, if a solvent is not included, a mixture of the precursor composition and the polyisocyanate compound (C component) can be processed into a multilayer sheet by co-extrusion molding and the like. Further, depending on the amount of the tetrahydrofuran insoluble content, a photochromic composition that does not include a solvent can also be processed into a multilayer sheet by co-extrusion molding and the like.

(Method for Integrating the Optical Base Material and the Multilayer Sheet)

In the present invention, the above-described photochromic multilayer sheet and an optical base material, such as a plastic lens body, can also be integrated. Examples of the starting material of this optical base material may include the same materials as mentioned as examples of the starting material of the above-described optical sheet or optical film. A preferred starting material is a polycarbonate resin.

Examples of the integration method include a method in which the multilayer sheet and the like of the present invention are placed in a mold, then the thermoplastic resin for forming the optical base material (e.g., the lens body), such as polycarbonate resin, is injection molded into the mold (hereinafter sometimes also referred to simply as an "injection molding method"), and a method of pasting the multilayer sheet and the like of the present invention with an adhesive to the surface of the optical base material. Further, the integration can also be carried out by dipping the above-described multilayer sheet (composite multilayer sheet) in a polymerizable monomer capable of forming the optical base material, and then curing the polymerizable monomer to embed the multilayer sheet in the optical base material. Consequently, the optical article may be an article formed by laminating the above-described multilayer sheet (which may be a composite multilayer sheet) on a plastic optical base material formed from a thermoplastic resin or a thermosetting resin, or an article formed by embedding the above-described multilayer sheet (which may be a complex multilayer sheet) in that plastic optical base material. Examples of the plastic isocyanate base material may include, other that the above-described polycarbonate resin, known resins such as a (meth)acrylate resin, an allyl resin, a (thio)urethane resin, and a (thio)epoxy resin.

The multilayer sheet of the present invention can also be processed into a lens-like spherical shape by performing bending processing before integrating with the optical base material. Examples of the method for bending the multilayer sheet into a spherical shape include hot pressing processing, pressure processing, vacuum suction processing and the like.

Hot pressing processing is carried out by, first, mounting a convex mold and a concave mold having a desired spherical shape in a hot press machine, pressing the multilayer sheet with a fixed jig between the two molds, and heating the convex mold and the concave mold. Next, the multilayer sheet can be bended to the desired spherical shape by pressing with these heated molds from both sides of the multilayer sheet. Further, in the case of hot pressing, the bending treatment can also be carried out using only the convex mold, without using the concave mold. When performing hot pressing processing, the hot pressing can also be carried out by heating the whole atmosphere including the multilayer sheet, not just the molds.

Pressure processing uses an apparatus having a concave mold with a desired spherical shape. The multilayer sheet of the present invention is fixed by a fixed jig to this concave mold, a lower face side of the multilayer sheet is covered with a mold capable of injecting compressed air, and the whole configuration is heated with a heater. Next, compressed air is injected from the lower face side of the multilayer sheet to change the shape of the multilayer sheet into the concave mold shape.

Vacuum suction processing uses an apparatus having a concave mold with a desired spherical shape similar to pressure processing. The multilayer sheet of the present invention is either placed on, or fixed by a fixed jig to, this concave mold, and the whole configuration is heated with a heater. Next, the shape of the multilayer sheet is changed into the concave mold shape by performing vacuum suction from inside the concave mold.

Further, the shape of the multilayer sheet of the present invention can also be changed by combining pressure processing and vacuum suction processing.

Although the temperature during the bending processing may be appropriately determined based on the type of optical sheet or film used for the multilayer sheet of the present invention, it is preferred to perform the bending processing at a temperature of more than 120° C. to 200° C. or less.

Further, as a pre-treatment before the bending processing, it is preferred to perform a pre-heating treatment on the multilayer sheet of the present invention. If the multilayer sheet is subjected to the bending processing in a state in which it includes water or air from the atmosphere, the water or air inside the multilayer sheet can expand and produce defects such as air bubbles. Consequently, by performing the bending processing after a pre-heating treatment, the formation of air bubbles and the like can be suppressed. The pre-heating treatment may be carried out by leaving under a temperature of 40° C. to 120° C. for 5 minutes to 24 hours. Further, if performing this treatment under reduced pressure, the pre-heating treatment can be carried out by leaving, for example, in the case of a reduced pressure of about 1 to 10 kPa, under a temperature of 40 to 60° C. for 10 minutes to 1 hour. Further, under ordinary pressure, it is preferred to leave under a temperature of 50 to 120° C. for 5 minutes to 3 hours, and more preferably under a temperature of 70 to 110° C. for 10 minutes to 60 minutes.

The multilayer sheet subjected to the bending processing may be integrated with the optical base material by placing in the mold of an injection molding machine, and performing injection molding. For the injection molding, a common injection molding machine, injection compression molding machine and the like may be used. The molding conditions for the injection molding may be appropriately determined based on the type and properties of the resin forming the optical base material. Usually, the resin temperature in the molding machine is 180 to 330° C., and preferably is 200 to 320° C. Further, the injection pressure is 50 to 1,700 kg/cm$^2$, and preferably 70 kg/cm$^2$ to 1,500 kg/cm$^2$.

Problems such as surface distortion and elution or peeling from the side face of the multilayer sheet due to melting of the adhesive layer were not observed even when injection molding was carried out at a higher temperature than when a urethane resin that did not have urea bonds was used for the adhesive layer. This is believed to be due to the excellent heat resistance of the multilayer sheet of the present invention. Dynamic viscoelasticity was measured as an index of the heat resistance of A component of the present invention. The measurement was carried out at a frequency of 1.0 Hz, a temperature range of −100 to 200° C., a rate of increase in temperature of 3° C./minute, and a dynamic displacement of 0.2%, using a 1 mm-thick specimen. From the perspective of the above-described effects, the value of the dynamic storage modulus E' at 150° C. of A component is preferably 1 to 20 MPa.

EXAMPLE

Hereinafter, the present invention will be described in further detail, by using the examples. These examples are to simply describe the present invention, and the scope and the spirit of the present invention is not to be limited to these examples.

Hereinafter, the abbreviation of the compounds or so used as each component in the examples and the comparative examples are listed.

A1 Component: Polyol Compound

PL1: DURANOL made by Asahi Kasei Chemicals Corporation (polycarbonate diol having 1,5-pentane diol and hexane diol as the material, the number average molecular weight 500).

PL2: DURANOL made by Asahi Kasei Chemicals Corporation (polycarbonate diol having 1,5-pentane diol and hexane diol as the material, the number average molecular weight 800).

PL3: DURANOL made by Asahi Kasei Chemicals Corporation (polycarbonate diol having 1,5-pentane diol and hexane diol as the material, the number average molecular weight 1000).

PL4: DURANOL made by Asahi Kasei Chemicals Corporation (polycarbonate diol having 1,5-pentanediol and hexanediol as the material, the number average molecular weight 2000).

PL5: PRACCEL made by DAICEL CORPORATION (polycaprolactonediol, the number average molecular weight 830).

PL6: PRACCEL made by DAICEL CORPORATION (polycaprolactonediol, the number average molecular weight 1000).

PL7: PRACCEL made by DAICEL CORPORATION (polycaprolactonediol, the number average molecular weight 3000).

PL8: DURANOL, made by Asahi Kasei Chemicals Corporation (polycarbonate diol having 2-methyl-1,3-propanediol and 1,4-butanediol as the material, the number average molecular weight 800).

A2 Component: Diisocyanate Compound

NCO1: isophorone diisocyanate.

NCO2: isomer mixture of 4,4'-methylenebis(cyclohexylisocyanate).

NCO3: hexamethylene-1,6-diisocyanate.

NCO4: norbornane diisocyanate.

A3 Component: The Amino Group Containing Compound (the Chain Extender)

CE1: isophorone diamine.

CE2: 1,6-diaminohexane.

CE3: N,N'-diethylethylenediamine.

CE4: bis-(4-aminocyclohexyl)methane.

A4 Component: The Functionalization Compound

HA1: 1,2,2,6,6-pentamethyl-4-hydroxypiperidine.

HA2: 1,2,2,6,6-pentamethyl-4-aminopiperidine.

A5 Component: The Terminator

HA3: normal butylamine.

B Component: The Photochromic Compound

PC1: the compound shown in the following formula.

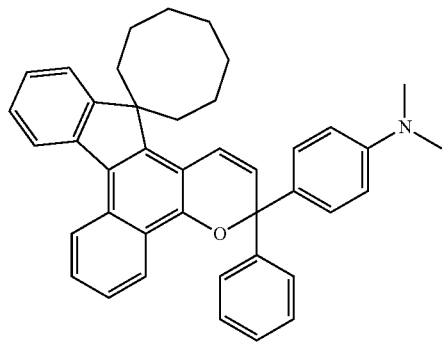

PC2: the compound shown by the following formula.

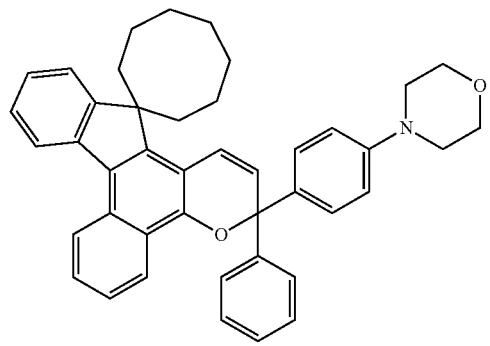

PC3: the compound shown by the following formula.

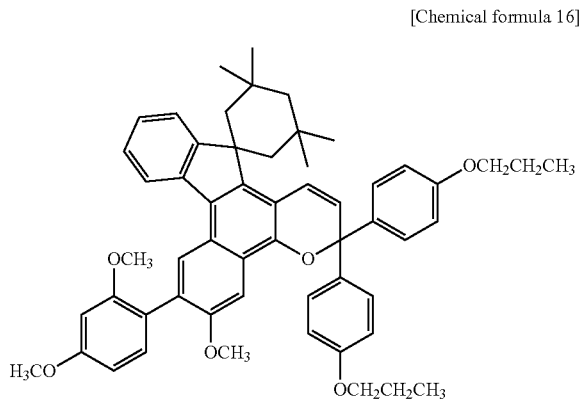

C Component: Polyisocyanate Compound

C1: an isomer mixture of a 4,4'-methylenebis(cyclohexyl-isocyanate) (molecular weight 262).

C2: A trimer of isophorone diisocyanate (made by Perstorp Holding AB, commercial name "Tolonate IDT70B," 30% of butyl acetate mixture, the molecular weight 666).

D Component: The Organic Solvent

D1: isopropyl alcohol.

D2: propyleneglycol-monomethylether.

D3: toluene.

D4: ethyl acetate.

D5: cyclohexanone.

D6: THF (tetrahydrofurane).

D7: diethyl ketone.

D8: t-butyl alcohol.

D9: methanol.

the Other Components

L1: ethylenebis(oxyethylene)bis[3-(5-tert-butyl-4-hydroxy-m-tolyl)propionate] (made by Ciba Specialty Chemicals Inc., Irganox 245).

L2: DOW CORNING TORAY L-7001 (made by Dow Corning Toray Co., Ltd., surfactant).

(Synthesis of A' Component)

Synthesis of Soluble Polyurethane-Urea Resin (U1)

Into a three-necked flask having a stirring blade, a cooling pipe, a thermometer, and a nitrogen gas introducing pipe, 251.9 g of polycarbonate diol having the number average molecular weight of 800 and 100 g of isophorone diisocyanate were added and reacted under nitrogen atmosphere at 110° C. for 7 hours to synthesize a prepolymer. The end point of the reaction was confirmed with the back-titration method of an isocyanate group. After completion of the reaction, the reaction liquid was cooled to about 30° C. and was dissolved into 1515 g of THF. Then, 19.2 g of isophorone diamine as a chain extender was dropped and reacted at 25° C. for 1 hour. Thereafter, 7.7 g of 1,2,2,6,6-pentamethyl-4-aminopiperidine was further dropped and reacted at 25° C. for 1 hour to obtain a THF solution of soluble polyurethane-urea resin (U1). The molecular weight of the obtained soluble polyurethane-urea resin was 18,000 (theoretical value; 17,000) in terms of polyoxyethylene, and the heat resistance was 100° C. The theoretical value of the molecular weight mentioned here refers to the molecular weight in the case that A1 component, A2 component, A3 component, and A4 component which were used as the source material theoretically form the straight polyurethane-urea resin without making crosslink. Moreover, the molecular weight in terms of polyoxyethylene is a value calculated under the GPC measurement condition described in the example 1. The whole amount of the obtained soluble polyurethane-urea resin (U1) was dissolved in tetrahydrofuran insoluble content measurement described in the following example 1.

Synthesis of Soluble Polyurethane-Urea Resin (U2) to (U21)

U2 to U21 were synthesized by the same method as the synthetic method of U1, except for using a polyol compound (A1 component), diisocyanate compound (A2 component), an amino group containing compound (A3 component), a functionalization compound (A4 component), which are shown in Table 1, and a reaction solvent; and the reaction condition shown in Table 1. The whole amount of the obtained soluble polyurethane-urea resins (U2) to (U21) was dissolved in tetrahydrofuran insoluble content measurement described in the following example 1.

TABLE 1

| Soluble polyurethane urea resin (A' component) | The synthesis condition of urethane prepolymer ||||||  Organic solvent ||
| | A1 || A2 || The reaction condition || D component ||
| | Compound | The added amount (g) | Compound | The added amount (g) | Temp. (° C.) | Time (hour) | Compound | The added amount (g) |
|---|---|---|---|---|---|---|---|---|
| U1  | PL2 | 251.9 | NCO1 | 100.0 | 110 | 7  | D6 | 1515 |
| U2  | PL1 | 157.4 | NCO1 | 100.0 | 110 | 7  | D6 | 1137 |
| U3  | PL3 | 314.9 | NCO1 | 100.0 | 110 | 7  | D6 | 1767 |
| U4  | PL4 | 629.8 | NCO1 | 100.0 | 110 | 7  | D6 | 3026 |
| U5  | PL5 | 261.4 | NCO1 | 100.0 | 110 | 7  | D6 | 1553 |
| U6  | PL6 | 314.9 | NCO1 | 100.0 | 110 | 7  | D6 | 1767 |
| U7  | PL7 | 944.7 | NCO1 | 100.0 | 110 | 7  | D6 | 4286 |
| U8  | PL8 | 251.9 | NCO1 | 100.0 | 110 | 7  | D6 | 1515 |
| U9  | PL2 | 213.4 | NCO2 | 100.0 | 110 | 7  | D6 | 1345 |
| U10 | PL2 | 332.9 | NCO3 | 100.0 | 110 | 7  | D6 | 1873 |
| U11 | PL2 | 314.3 | NCO4 | 100.0 | 110 | 7  | D6 | 1791 |
| U12 | PL2 | 251.9 | NCO1 | 100.0 | 110 | 7  | D6 | 1491 |
| U13 | PL2 | 251.9 | NCO1 | 100.0 | 110 | 7  | D6 | 1478 |
| U14 | PL2 | 251.9 | NCO1 | 100.0 | 110 | 7  | D6 | 1533 |
| U15 | PL2 | 305.9 | NCO1 | 100.0 | 110 | 10 | D6 | 1692 |
| U16 | PL2 | 287.9 | NCO1 | 100.0 | 110 | 8  | D6 | 1639 |
| U17 | PL2 | 215.9 | NCO1 | 100.0 | 110 | 5  | D6 | 1427 |
| U18 | PL2 | 179.9 | NCO1 | 100.0 | 110 | 4  | D6 | 1321 |
| U19 | PL2 | 126.0 | NCO1 | 100.0 | 110 | 3  | D6 | 1060 |
| U20 | PL2 | 251.9 | NCO1 | 100.0 | 110 | 7  | D6 | 1540 |
| U21 | PL2 | 251.9 | NCO1 | 100.0 | 110 | 7  | D6 | 1527 |

| Soluble polyurethane urea resin (A' component) | The reaction condition of amino group containing compound |||| The reaction condition of functionalization compound ||||
| | A3 ||| | A4 ||| |
| | Compound | The added amount (g) | Temp. (° C.) | Time (hour) | Compound | The added amount (g) | Temp. (° C.) | Time (hour) |
|---|---|---|---|---|---|---|---|---|
| U1  | CE1 | 19.2 | 25 | 1 | HA2 | 7.7  | 25  | 1 |
| U2  | CE1 | 19.2 | 25 | 1 | HA2 | 7.7  | 25  | 1 |
| U3  | CE1 | 19.2 | 25 | 1 | HA2 | 7.7  | 25  | 1 |
| U4  | CE1 | 19.2 | 25 | 1 | HA2 | 7.7  | 25  | 1 |
| U5  | CE1 | 19.2 | 25 | 1 | HA2 | 7.7  | 25  | 1 |
| U6  | CE1 | 19.2 | 25 | 1 | HA2 | 7.7  | 25  | 1 |
| U7  | CE1 | 19.2 | 25 | 1 | HA2 | 7.7  | 25  | 1 |
| U8  | CE1 | 19.2 | 25 | 1 | HA2 | 7.7  | 25  | 1 |
| U9  | CE1 | 16.2 | 25 | 1 | HA2 | 6.5  | 25  | 1 |
| U10 | CE1 | 25.3 | 25 | 1 | HA2 | 10.1 | 25  | 1 |
| U11 | CE1 | 23.9 | 25 | 1 | HA2 | 9.6  | 25  | 1 |
| U12 | CE2 | 13.1 | 25 | 1 | HA1 | 7.7  | 120 | 5 |
| U13 | CE3 | 9.9  | 25 | 1 | HA2 | 7.7  | 25  | 1 |
| U14 | CE4 | 23.7 | 25 | 1 | HA2 | 7.7  | 25  | 1 |
| U15 | CE4 | 9.5  | 25 | 1 | HA2 | 7.7  | 25  | 1 |
| U16 | CE4 | 14.2 | 25 | 1 | HA2 | 7.7  | 25  | 1 |
| U17 | CE4 | 33.1 | 25 | 1 | HA2 | 7.7  | 25  | 1 |
| U18 | CE4 | 42.6 | 25 | 1 | HA2 | 7.7  | 25  | 1 |
| U19 | CE2 | 31.4 | 25 | 1 | HA1 | 7.7  | 120 | 5 |
| U20 | CE4 | 20.8 | 25 | 1 | HA2 | 12.3 | 25  | 1 |
| U21 | CE4 | 26.0 | 25 | 1 | HA2 | 3.8  | 25  | 1 |

The results of a mol blending ratio, a molecular weight, and heat resistant of A1, A2, A3, and A4 components of the soluble polyurethane-urea resins U2 to U21 are listed in Table 2.

TABLE 2

| Soluble polyurethane-urea resin (A' component) | The mol blending ratio of A1, A2, A3, A4 (n1/n2/n3/n4) | The molecular weight in terms of poly-oxyethylene | The theoretical value | The heat resistance (° C.) |
|---|---|---|---|---|
| U1 | 0.7/1/0.25/0.05 | 18,000 | 17,000 | 100 |
| U2 | 0.7/1/0.25/0.05 | 14,000 | 13,000 | 120 |
| U3 | 0.7/1/0.25/0.05 | 22,000 | 20,000 | 95 |
| U4 | 0.7/1/0.25/0.05 | 37,000 | 34,000 | 80 |
| U5 | 0.7/1/0.25/0.05 | 19,000 | 17,000 | 100 |
| U6 | 0.7/1/0.25/0.05 | 21,000 | 20,000 | 95 |
| U7 | 0.7/1/0.25/0.05 | 50,000 | 48,000 | 70 |
| U8 | 0.7/1/0.25/0.05 | 20,000 | 17,000 | 120 |
| U9 | 0.7/1/0.25/0.05 | 20,000 | 18,000 | 110 |
| U10 | 0.7/1/0.25/0.05 | 17,000 | 16,000 | 85 |
| U11 | 0.7/1/0.25/0.05 | 17,000 | 16,000 | 110 |
| U12 | 0.7/1/0.25/0.05 | 19,000 | 17,000 | 80 |
| U13 | 0.7/1/0.25/0.05 | 19,000 | 16,000 | 90 |
| U14 | 0.7/1/0.25/0.05 | 19,000 | 17,000 | 110 |
| U15 | 0.85/1/0.10/0.05 | 20,000 | 19,000 | 90 |
| U16 | 0.8/1/0.15/0.05 | 19,000 | 18,000 | 100 |
| U17 | 0.6/1/0.35/0.05 | 19,000 | 16,000 | 120 |
| U18 | 0.5/1/0.45/0.05 | 16,000 | 15,000 | 125 |
| U19 | 0.35/1/0.60/0.05 | 13,000 | 12,000 | 160 |
| U20 | 0.7/1/0.25/0.05 | 12,000 | 11,000 | 100 |
| U21 | 0.7/1/0.25/0.05 | 36,000 | 34,000 | 115 |

Synthesis of Polyurethane-Urea Resin for the Second Adhesive Layer (W1) to (W13)

W1 to W13 were synthesized by the same method as the synthetic method of U1, except for using a polyol compound (A1 component), diisocyanate compound (A2 component), an amino group containing compound (A3 component), a functionalization compound (A4 component), a terminator (A5 component), which are shown in Table 3, and a reaction solvent; and the reaction condition shown in Table 3.

TABLE 3

| Polyurethane-urea resin for second adhesive layer (E component) | The synthesis condition of urethane prepolymer | | | | | | Organic solvent D component | |
|---|---|---|---|---|---|---|---|---|
| | A1 | | A2 | | The reaction condition | | | |
| | Compound | The added amount (g) | Compound | The added amount (g) | Temp. (° C.) | Time (hr.) | Compound | The added amount (g) |
| W1 | PL1 | 135.0 | NCO1 | 100.0 | 110 | 7 | D2 | 1060.2 |
| W2 | PL2 | 215.9 | NCO1 | 100.0 | 110 | 7 | D2 | 1384.1 |
| W3 | PL3 | 269.9 | NCO1 | 100.0 | 110 | 7 | D2 | 1600.0 |
| W4 | PL4 | 539.8 | NCO1 | 100.0 | 110 | 7 | D2 | 2679.6 |
| W5 | PL5 | 224.0 | NCO1 | 100.0 | 110 | 7 | D2 | 1416.5 |
| W6 | PL6 | 269.9 | NCO1 | 100.0 | 110 | 7 | D2 | 1600.0 |
| W7 | PL7 | 809.7 | NCO1 | 100.0 | 110 | 7 | D2 | 3759.3 |
| W8 | PL8 | 215.9 | NCO1 | 100.0 | 110 | 7 | D2 | 1384.1 |
| W9 | PL3 | 382.4 | NCO1 | 100.0 | 110 | 10 | D2 | 1973.3 |
| W10 | PL3 | 337.4 | NCO1 | 100.0 | 110 | 8 | D2 | 1839.3 |
| W11 | PL3 | 247.4 | NCO1 | 100.0 | 110 | 5 | D2 | 1525.4 |
| W12 | PL3 | 224.9 | NCO1 | 100.0 | 110 | 4 | D2 | 1450.7 |
| W13 | PL3 | 157.4 | NCO1 | 100.0 | 110 | 3 | D2 | 1226.8 |

| Polyurethane-urea resin for second adhesive layer (E component) | The reaction condition of amino group containing compound | | | | The reaction condition of functionalization compound, terminator | | | |
|---|---|---|---|---|---|---|---|---|
| | A3 | | | | A4 or E5 | | | |
| | Compound | The added amount (g) | Temp. (° C.) | Time (hr.) | Compound | The added amount (g) | Temp. (° C.) | Time (hr.) |
| W1 | CE1 | 26.8 | 25 | 1 | HA3 | 3.3 | 25 | 1 |
| W2 | CE1 | 26.8 | 25 | 1 | HA3 | 3.3 | 25 | 1 |
| W3 | CE1 | 26.8 | 25 | 1 | HA3 | 3.3 | 25 | 1 |
| W4 | CE1 | 26.8 | 25 | 1 | HA3 | 3.3 | 25 | 1 |
| W5 | CE1 | 26.8 | 25 | 1 | HA3 | 3.3 | 25 | 1 |
| W6 | CE1 | 26.8 | 25 | 1 | HA3 | 3.3 | 25 | 1 |
| W7 | CE1 | 26.8 | 25 | 1 | HA3 | 3.3 | 25 | 1 |
| W8 | CE1 | 26.8 | 25 | 1 | HA3 | 3.3 | 25 | 1 |
| W9 | CE1 | 7.7 | 25 | 1 | HA3 | 3.3 | 25 | 1 |
| W10 | CE1 | 19.2 | 25 | 1 | HA3 | 3.3 | 25 | 1 |

TABLE 3-continued

| | | | | | | | | |
|---|---|---|---|---|---|---|---|---|
| W11 | CE1 | 30.6 | 25 | 1 | HA3 | 3.3 | 25 | 1 |
| W12 | CE1 | 34.5 | 25 | 1 | HA3 | 3.3 | 25 | 1 |
| W13 | CE1 | 46.0 | 25 | 1 | HA3 | 3.3 | 25 | 1 |

The results of a mol blending ratio, a molecular weight, and heat resistant of A1, A2, A3, A4, and A5 components of the polyurethane-urea resins for the second adhesive layer W1 to W13, were summarized in Table 4.

TABLE 4

| Polyurethane-urea resin for second adhesive layer (E component) | The mole blending ratio of A1, A2, A3, A4 (n1/n2/n3/n4) | The molecular weight | | The heat resistance (° C.) | The surface free energy (mJ/m²) | Solubility parameter (SP value) |
|---|---|---|---|---|---|---|
| | | in terms of polyoxyethylene | The theoretical value | | | |
| W1 | 0.6/1/0.35/0.05 | 13,000 | 12,000 | 125 | 58.8 | 10.1 |
| W2 | 0.6/1/0.35/0.05 | 17,000 | 15,000 | 110 | 57.0 | 10.3 |
| W3 | 0.6/1/0.35/0.05 | 22,000 | 18,000 | 105 | 55.0 | 10.4 |
| W4 | 0.6/1/0.35/0.05 | 33,000 | 30,000 | 90 | 57.5 | 10.8 |
| W5 | 0.6/1/0.35/0.05 | 17,000 | 16,000 | 115 | 53.6 | 9.4 |
| W6 | 0.6/1/0.35/0.05 | 20,000 | 18,000 | 105 | 54.5 | 9.5 |
| W7 | 0.6/1/0.35/0.05 | 45,000 | 42,000 | 85 | 59.1 | 10.5 |
| W8 | 0.6/1/0.35/0.05 | 18,000 | 15,000 | 130 | 60.3 | 11.0 |
| W9 | 0.85/1/0.10/0.05 | 23,000 | 22,000 | 90 | 59.2 | 10.9 |
| W10 | 0.75/1/0.20/0.05 | 25,000 | 20,000 | 100 | 58.3 | 10.7 |
| W11 | 0.55/1/0.40/0.05 | 18,000 | 17,000 | 120 | 54.7 | 10.3 |
| W12 | 0.50/1/0.45/0.05 | 19,000 | 16,000 | 130 | 54.3 | 10.2 |
| W13 | 0.35/1/0.60/0.05 | 17,000 | 14,000 | 180 | 53.4 | 9.8 |

Example 1

Preparation of Precursor Composition

The followings were added and mixed with stirring at room temperature to obtain a precursor composition: 25 g of a THF solution of the soluble polyurethane-urea resin (U1), 0.162 g of the photochromic compound (PC1), 0.4 g of an isomer mixture of 4,4'-methylenebis(cyclohexylisocyanate), additionally 20 mg of ethylenebis(oxyethylene)bis[3-(5-tert-butyl-4-hydroxy-m-tolyl)propionate] as an antioxidant, and 2.5 mg of DOW CORNING TORAY L-7001 as a surfactant.

Production of Multilayer Sheet

The above-mentioned precursor composition was applied on a film made of PET (polyethylene terephthalate) (PUREX film, made by Teijin DuPont Films Japan Limited, with a silicon-coated film). After drying for 10 minutes at 110° C., the PET film was removed to obtain a photochromic adhesive sheet having about 40 μm thickness. Subsequently, the obtained photochromic adhesive sheet was sandwiched between two 400 μm-thick polycarbonate sheets. After standing at 40° C. under a vacuum for 24 hours, heating treatment was performed at 110° C. for 60 minutes, and then humidification treatment was performed at 60° C. and 100% RH for 24 hours, and finally it was left at 40° C. under a vacuum for 24 hours to obtain a multilayer sheet having desired photochromic characteristic. The finally obtained photochromic adhesive sheet was released from the polycarbonate sheet. When infrared absorption spectrum was checked, a peak of the isocyanate group was not detected in the photochromic adhesive sheet.

The photochromic adhesive sheet (photochromic composition) was released from the obtained multilayer sheet, and then evaluation was performed. As a result, a tetrahydrofuran insoluble content was 34.8 mass %, and the amount of the high molecular weight component was 15.4 mass %. Moreover, the peak top molecular weight (Mp) of the high molecular weight component was 350,000. The color optical density was 1.0, the color fading speed was 45 seconds, and the durability was 93% as the photochromic characteristic. The initial adhesive strength was 140 N/25 mm, the adhesive strength after a boiling test was 110 N/25 mm, and the adhesive strength after a weather resistance test was 110 N/25 mm. Adhesion stable time in a sweat proof test was 120 hours. These evaluations were performed as follows.

Tetrahydrofuran Insoluble Content

As for a sample used for measurement of a tetrahydrofuran insoluble content, the two polycarbonate sheets were removed from the above-mentioned multilayer sheet, and the photochromic adhesive sheet (photochromic composition) was separated to be a sample.

A cylinder filter made of glass fiber (suspension particle diameter: 1 μm) in which about 1 g of the sample (sample form: about 45 μm of film thickness, about 10 cm×15 cm) was added was installed in a Soxhlet extractor, and about 100 ml of tetrahydrofuran was refluxed for 6 hours. After the reflux, an insoluble content remaining in the filter was dried together with the filter and weighed, and the difference from the filter weight before the test was defined as a weight of the insoluble content. This weight was divided by the added sample weight to calculate the tetrahydrofuran insoluble content of the present invention. The photochromic compound (B component) is soluble in tetrahydrofuran, and therefore is not included in the tetrahydrofuran insoluble content. The value of the tetrahydrofuran insoluble content is a value calculated by excluding the mass of this photochromic compound (B component).

High Molecular Weight Component

The sample used for the above-mentioned measurement of the tetrahydrofuran insoluble content was used, and GPC measurement was performed by the method described herein to calculate a ratio of the high molecular weight component.

In addition, a molecular weight was measured. For specific conditions, the measurement was performed using GPC: WATERS 2695 made by Waters Corporation, detector: differential refractometer WATERS 2414, column: Shodex KD-806M made by Showa Denko K.K., eluate: 10 mmol/L of LiBr (lithium bromide)/DMF (dimethyl formamide), at column temperature: 40° C., flow speed: 1 ml/min, and sample concentration: 0.5%. TSK gel standard polyethylene oxide made by Tosoh Corporation was used as a standard sample.

The Photochromic Characteristic

By using the obtained multilayer sheet as the sample, the light was irradiated to said sample for 120 seconds using Xenon Lamp L-2480(300 W) SHL-100 made by Hamamatsu Photonics K.K. via Aeromass filter (made by Corning Incorporated) at 23° C. and the beam intensity of 365 nm=2.4 mW/cm$^2$, 245 nm=24 µW/cm$^2$ at the multilayer sheet surface for 120 seconds for the color development, and measured the photochromic characteristic of the multilayer sheet.

1) The maximum absorption wave length (λmax): it is the maximum absorption wave length obtained from the spectrophotometer (Multichannel Photo Detector-MCPD1000) made by OTSUKA ELECTRONICS CO., LTD. Said maximum absorption wave length relates to the color tone during the color development.

2) The color optical density {ε(120)–ε(0)}: the difference between the absorbance ε(120) after irradiating for 120 seconds at said maximum absorption wave length and the absorbance ε(0) at no irradiation at the maximum absorption wave length. As this value is higher, it indicates that the photochromic property is further excellent.

3) The color fading speed {t½(sec.)}: the time required to reduce the absorbance at said maximum absorption wave length of the sample to be ½ when the light irradiation is stopped after 120 seconds irradiation. As this time is shorter, it indicates that the photochromic property is further excellent.

4) The durability (%)={(A96/A0)×100}: the accelerated deterioration test was carried out in order to evaluate the durability of the color development due to the light irradiation. That is, the obtained multilayer sheet was carried out with the accelerated deterioration for 48 hours by Xenon Weather Meter X25 made by Suga Test Instrument Co., Ltd. Then, the evaluation of said color optical density was carried out before and after the test, and measured the color optical density before the test (A0) and the color optical density after the test (A96). The value obtained by {(A96/A0)×100 was determined as the remaining ratio (%), and defined as the standard of the durability of the color development. As the remaining ratio is higher, it indicates that the durability is higher.

Adhesive Strength

The obtained multilayer sheet was made into a sample piece having the adhesive portion of 25×100 mm, and installed to the test machine (Autograph AGS-5000NX, made by Shimadzu Corporation). The tensile test was carried out at the cross head speed of 100 mm/min, and the adhesive strength of each of the following 1) to 3) was measured.

1) Initial adhesive strength was examined as described above.
2) Adhesive strength after a boiling test was measured as described above after the sample piece cut to the above size was immersed in boiling distilled water for 1 hour.
3) Adhesive strength after a weather resistance test was measured as described above after the sample piece cut to the above size was subjected to a accelerated deterioration test for 96 hours as with the "durability" described in the item of the above-mentioned photochromic characteristic.

Sweat Proof Test

The obtained multilayer sheet was cut to a circle having 50 mm diameter, and this sample piece was bound tight with a jig made of stainless steel. Separately, population perspiration (distilled water to which 10% of salt and 5% of lactic acid were added) was provided in a plastic container with a lid, and the above-mentioned sample piece was immersed in this artificial sweat. The plastic container containing this sample piece and artificial sweat was kept at 70° C., and visual evaluation of presence or absence of peeling at the end of the sample piece was carried out every 24 hours. The numerical value of the evaluation result is the time during which stable adhesive property was shown (time until the occurrence of peeling).

Example 2

Preparation of Precursor Composition

The same precursor composition was obtained by the same method as the preparation of the precursor composition in the example 1.

Adjustment of Adhesive Agent for the Second Adhesive Layer 2.5 mg of DOW CORNING TORAY L-7001 as a surfactant was added to 25 g of propylene glycol monomethyl ether solution of polyurethane-urea resin for the second adhesive layer (W1), and mixed with stirring at room temperature to obtain an adhesive agent for the second adhesive layer.

Production of Multilayer Sheet

The adhesive agent for the second adhesive layer was applied on a 400 µm-thick polycarbonate sheet, and dried at 110° C. for 10 minutes to obtain a polycarbonate sheet having the 5 µm-thick second adhesive layer.

The above-mentioned precursor composition was applied on a film made of PET (PUREX film made by Teijin DuPont Films Japan Limited, with a silicon-coated film). After drying at 110° C. for 10 minutes, the PET film was removed to obtain a photochromic adhesive sheet having a thickness of about 40 µm. Subsequently, the obtained photochromic adhesive sheet was sandwiched between two polycarbonate sheets having the above-mentioned second adhesive layer. After standing at 40° C. under a vacuum for 24 hours, heating treatment was performed at 110° C. for 60 minutes, and then humidification treatment was performed at 60° C. and 100% RH for 24 hours, and finally it was left at 40° C. under a vacuum for 24 hours to obtain a multilayer sheet having desired photochromic characteristic. The finally obtained photochromic adhesive sheet was released from the polycarbonate sheet. When infrared absorption spectrum was checked, a peak of the isocyanate group was not detected in the photochromic adhesive sheet.

When A component contained in the obtained multilayer sheet was evaluated, a tetrahydrofuran insoluble content was 34.8 mass %, and the amount of the high molecular weight component was 15.5 mass %. The color optical density was 1.0, the color fading speed was 45 seconds, and the durability was 93% as the photochromic characteristic. Moreover, the initial adhesive strength was 200 N/25 mm, the adhesive strength after a boiling test was 180 N/25 mm, and the adhesive strength after a weather resistance test was 190 N/25 mm. Adhesion stable time in the sweat proof test was 336 hours. The tetrahydrofuran insoluble content was evaluated by the following evaluation method, and the other evaluations were performed as described in the example 1.

Tetrahydrofuran Insoluble Content, High Molecular Weight Component

When a multilayer sheet was produced using the second adhesive layer, it was difficult to release only the photochromic adhesive sheet, and therefore a sample was produced with the following methods.

Aside from the above-mentioned multilayer sheet, the sample used for measurement of the tetrahydrofuran insoluble content and the high molecular weight component was subjected to the same post-treatment and the like as in the case of obtaining the above-mentioned multilayer sheet after the same precursor composition was applied between two sheets of PET film. Thereafter, the PET film was removed to obtain the photochromic adhesive sheet (sample: A component).

A cylinder filter made of glass fiber into which about 1 g of the sample was added was installed in a Soxhlet extractor, and about 100 ml of tetrahydrofuran was refluxed for 3 hours. After the reflux, an insoluble content remaining in the filter was dried together with the filter and weighed. The difference from the filter weight before the test was defined as a weight of the insoluble content. This weight was divided by the added sample weight to calculate the tetrahydrofuran insoluble content of the present invention.

Moreover, the high molecular weight component was measured by the same method as the example 1.

As is clear from comparison of the example 1 and the example 2, it was confirmed that the photochromic adhesive sheet (photochromic composition) produced between two polycarbonate sheets has the equal amounts of the tetrahydrofuran insoluble content and high molecular weight component to those of the photochromic adhesive sheet (photochromic composition) produced with the same operation between two sheets of the PET film. Therefore, when the second adhesive layer was used, there was evaluated the photochromic adhesive sheet (photochromic composition) produced with the same operation between two sheets of the PET film.

Examples 3 to 41

The precursor composition was adjusted by the same method as the example 2 except for using (A') the soluble polyurethane-urea resin, (B) the photochromic compound, and (C) the polyisocyanate compound shown in Tables 5 and 6.

Moreover, the polycarbonate sheet having the second adhesive layer was produced according to the blending shown in Table 7 by the same method as the example 2 (the thickness of the second adhesive layer is shown in Table 7).

With use of the precursor composition shown in Tables 5 and 6 and the polycarbonate sheet having the second adhesive layer shown in Table 7, the multilayer sheet was produced by the same method as the example 2 (the first adhesive layer the thickness of a photochromic adhesive sheet, the tetrahydrofuran insoluble content, and the high molecular weight component are shown in Tables 5 and 6). The evaluation results of the obtained multilayer sheets are shown in Table 8.

Comparative Examples 1 to 3, 3a

The precursor composition was adjusted by the same method as the example 2 except for using (A') the soluble polyurethane-urea resin, (B) the photochromic compound, and (C) the polyisocyanate compound shown in Table 6.

Moreover, the polycarbonate sheet having the second adhesive layer was produced according to the blending shown in Table 7 by the same method as the example 2 (the thickness of the second adhesive layer is shown in Table 7).

With use of the precursor composition shown in Table 6 and the polycarbonate sheet having the second adhesive layer shown in Table 7, the multilayer sheet was produced by the same method as the example 2 (the first adhesive layer: the thickness of a photochromic adhesive sheet, the tetrahydrofuran insoluble content, and the high molecular weight component are shown in Table 6). The evaluation results of the obtained multilayer sheets are shown in Table 8.

TABLE 5

First adhesive layer (precursor composition) and photochromic composition

| | A component | | | | | | | | | | | | High molecular weight component | |
|---|---|---|---|---|---|---|---|---|---|---|---|---|---|---|
| | A' component | | C component | | D component | | B component | | The Others | | | | | |
| Example No. | Type | The added amount (g) | Type | The added amount (g) | Type | The added amount (g) | Type | The added amount (g) | Type | The added amount (mg) | The film thickness (μm) | THF insoluble content (mass %) | The mass (%) | The molecular weight at peak top |
| Ex. 1 | U1 | 5 | C1 | 0.4 | D6 | 20 | PC1 | 0.162 | L1/L2 | 20/2.5 | 40 | 34.8 | 15.4 | 350000 |
| Ex. 2 | U1 | 5 | C1 | 0.4 | D6 | 20 | PC1 | 0.162 | L1/L2 | 20/2.5 | 40 | 34.8 | 15.5 | 350000 |
| Ex. 3 | U1 | 5 | C2 | 0.6 | D6 | 20 | PC1 | 0.168 | L1/L2 | 20/2.5 | 40 | 27.3 | 13.8 | 280000 |
| Ex. 4 | U2 | 5 | C1 | 0.4 | D6 | 20 | PC1 | 0.162 | L1/L2 | 20/2.5 | 40 | 33.7 | 15.2 | 250000 |
| Ex. 5 | U3 | 5 | C1 | 0.4 | D6 | 20 | PC1 | 0.162 | L1/L2 | 20/2.5 | 40 | 34.7 | 15.4 | 380000 |
| Ex. 6 | U4 | 5 | C1 | 0.4 | D6 | 20 | PC1 | 0.162 | L1/L2 | 20/2.5 | 40 | 33.8 | 15.7 | 420000 |
| Ex. 7 | U5 | 5 | C1 | 0.4 | D6 | 20 | PC1 | 0.162 | L1/L2 | 20/2.5 | 40 | 34.9 | 15.1 | 230000 |
| Ex. 8 | U6 | 5 | C1 | 0.4 | D6 | 20 | PC1 | 0.162 | L1/L2 | 20/2.5 | 40 | 35.6 | 14.8 | 250000 |
| Ex. 9 | U7 | 5 | C1 | 0.4 | D6 | 20 | PC1 | 0.162 | L1/L2 | 20/2.5 | 40 | 34.6 | 15.3 | 300000 |
| Ex. 10 | U8 | 5 | C1 | 0.4 | D6 | 20 | PC1 | 0.162 | L1/L2 | 20/2.5 | 42 | 35.8 | 15.2 | 340000 |
| Ex. 11 | U9 | 5 | C1 | 0.4 | D6 | 20 | PC1 | 0.162 | L1/L2 | 20/2.5 | 42 | 36.2 | 15.9 | 330000 |
| Ex. 12 | U10 | 5 | C1 | 0.4 | D3/D6 | 5/15 | PC1 | 0.162 | L1/L2 | 20/2.5 | 40 | 35.4 | 14.8 | 350000 |
| Ex. 13 | U11 | 5 | C1 | 0.4 | D4/D6 | 5/15 | PC1 | 0.162 | L1/L2 | 20/2.5 | 40 | 34.6 | 14.7 | 330000 |
| Ex. 14 | U12 | 5 | C1 | 0.4 | D6 | 20 | PC1 | 0.162 | L1/L2 | 20/2.5 | 40 | 35.2 | 15.3 | 350000 |
| Ex. 15 | U13 | 5 | C1 | 0.4 | D6 | 20 | PC1 | 0.162 | L1/L2 | 20/2.5 | 40 | 34.2 | 15.4 | 350000 |
| Ex. 16 | U14 | 5 | C1 | 0.3 | D6/D7 | 10/10 | PC1 | 0.159 | L1/L2 | 20/2.5 | 40 | 26.4 | 11.2 | 270000 |
| Ex. 17 | U14 | 5 | C1 | 0.4 | D6/D7 | 10/10 | PC1 | 0.162 | L1/L2 | 20/2.5 | 40 | 37.5 | 19.7 | 330000 |
| Ex. 18 | U14 | 5 | C1 | 0.75 | D6/D7 | 10/10 | PC1 | 0.173 | L1/L2 | 20/2.5 | 41 | 63.2 | 28.8 | 350000 |
| Ex. 19 | U14 | 5 | C1 | 1.0 | D6/D7 | 10/10 | PC1 | 0.180 | L1/L2 | 20/2.5 | 42 | 75.0 | 35.5 | 340000 |
| Ex. 20 | U15 | 5 | C1 | 0.4 | D5/D6/D7 | 2/8/10 | PC1 | 0.162 | L1/L2 | 20/2.5 | 40 | 34.5 | 15.5 | 330000 |

TABLE 5-continued

First adhesive layer (precursor composition) and photochromic composition

| | A component | | | | | | | | | | | | High molecular weight component | |
|---|---|---|---|---|---|---|---|---|---|---|---|---|---|---|
| | A' component | | C component | | D component | | B component | | The Others | | | | | |
| Example No. | Type | The added amount (g) | Type | The added amount (g) | Type | The added amount (g) | Type | The added amount (g) | Type | The added amount (mg) | The film thickness (μm) | THF insoluble content (mass %) | The mass (%) | The molecular weight at peak top |
| Ex. 21 | U16 | 5 | C1 | 0.4 | D6 | 20 | PC1 | 0.162 | L1/L2 | 20/2.5 | 40 | 35.2 | 15.6 | 300000 |
| Ex. 22 | U17 | 5 | C1 | 0.4 | D6 | 20 | PC1 | 0.162 | L1/L2 | 20/2.5 | 40 | 35.4 | 15.3 | 320000 |
| Ex. 23 | U18 | 5 | C1 | 0.4 | D6 | 20 | PC1 | 0.162 | L1/L2 | 20/2.5 | 40 | 34.6 | 15.1 | 360000 |
| Ex. 24 | U19 | 5 | C2 | 1.0 | D6 | 20 | PC1 | 0.180 | L1/L2 | 20/2.5 | 40 | 41.5 | 20.7 | 360000 |
| Ex. 25 | U20 | 5 | C2 | 0.75 | D6 | 20 | PC1 | 0.180 | L1/L2 | 20/2.5 | 43 | 32.5 | 15.8 | 360000 |
| Ex. 26 | U21 | 5 | C2 | 0.75 | D6 | 20 | PC1 | 0.180 | L1/L2 | 20/2.5 | 40 | 33.2 | 16.1 | 350000 |

TABLE 6

First adhesive layer (precursor composition) and Photochromic composition

| | A component | | | | | | | | | | | | The high molecular weight component | |
|---|---|---|---|---|---|---|---|---|---|---|---|---|---|---|
| | A' component | | C component | | D component | | B component | | The Others | | | | | |
| Example No. | Type | The added amount (g) | Type | The added amount (g) | Type | The added amount (g) | Type | The added amount (g) | Type | The added amount (mg) | The film thickness (μm) | THF insoluble content (mass %) | The mass (%) | The molecular weight at peak top |
| Ex. 27 | U14 | 5 | C1 | 0.4 | D6 | 20 | PC1/PC2/PC3 | 0.02/0.02/0.11 | L1/L2 | 20/2.5 | 42 | 37.5 | 19.7 | 350000 |
| Ex. 28 | U14 | 5 | C1 | 0.4 | D6 | 20 | PC1/PC2/PC3 | 0.02/0.02/0.11 | L1/L2 | 20/2.5 | 40 | 37.5 | 19.7 | 360000 |
| Ex. 29 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 30 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 31 | U14 | 5 | C1 | 0.4 | D6 | 20 | PC1/PC2/PC3 | 0.02/0.02/0.11 | L1/L2 | 20/2.5 | 42 | 37.5 | 19.7 | 360000 |
| Ex. 32 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 33 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 34 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 35 | U14 | 5 | C1 | 0.4 | D6 | 20 | PC1/PC2/PC3 | 0.02/0.02/0.11 | L1/L2 | 20/2.5 | 40 | 37.5 | 19.7 | 360000 |
| Ex. 36 | U14 | 5 | C1 | 0.4 | D6 | 20 | PC1/PC2/PC3 | 0.02/0.02/0.11 | L1/L2 | 20/2.5 | 42 | 37.5 | 19.7 | 350000 |
| Ex. 37 | U14 | 5 | C1 | 0.4 | D6 | 20 | PC1/PC2/PC3 | 0.02/0.02/0.11 | L1/L2 | 20/2.5 | 41 | 37.5 | 19.7 | 350000 |
| Ex. 38 | U14 | 5 | C1 | 0.4 | D6 | 20 | PC1/PC2/PC3 | 0.02/0.02/0.11 | L1/L2 | 20/2.5 | 42 | 37.5 | 19.7 | 360000 |
| Ex. 39 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 40 | U14 | 5 | C1 | 0.4 | D6 | 20 | PC1/PC2/PC3 | 0.02/0.02/0.11 | L1/L2 | 20/2.5 | 40 | 37.5 | 19.7 | 350000 |
| Ex. 41 | U14 | 5 | C1 | 0.4 | D6 | 20 | PC1/PC2/PC3 | 0.02/0.02/0.11 | L1/L2 | 20/2.5 | 40 | 37.5 | 19.7 | 360000 |
| Comp. Ex. 1 | U14 | 5 | C2 | 0 | D6/D7 | 10/10 | PC1 | 0.150 | L1/L2 | 20/2.5 | 40 | 0.0 | 0.0 | — |
| Comp. Ex. 2 | U14 | 5 | C2 | 0.1 | D6/D7 | 10/10 | PC1 | 0.153 | L1/L2 | 20/2.5 | 40 | 8.4 | 3.9 | 320000 |
| Comp. Ex. 3 | U14 | 5 | C2 | 1.5 | D6/D7 | 10/10 | PC1 | 0.195 | L1/L2 | 20/2.5 | 40 | 99.0 | 55.0 | 370000 |
| Comp. Ex. 3a | U14 | 5 | C1 | 0.18 | D6/D7 | 10/10 | PC1 | 0.154 | L1/L2 | 20/2.5 | 40 | 16.2 | 9.2 | 350000 |

TABLE 7

| | The second adhesive layer | | | | | |
| --- | --- | --- | --- | --- | --- | --- |
| | E component | | D component | | The Others | |
| Ex. No. | Type | The added amount (g) | Type | The added amount (g) | Type | The added amount (mg) | The film thickness (μm) |
| Ex. 1 | — | — | — | — | — | — | — |
| Ex. 2 | W12 | 5 | D2 | 20 | L2 | 2.5 | 5 |
| Ex. 3 | W12 | 5 | D2 | 20 | L2 | 2.5 | 7 |
| Ex. 4 | W12 | 5 | D2 | 20 | L2 | 2.5 | 5 |
| Ex. 5 | W12 | 5 | D2 | 20 | L2 | 2.5 | 7 |
| Ex. 6 | W12 | 5 | D2 | 20 | L2 | 2.5 | 7 |
| Ex. 7 | W12 | 5 | D2 | 20 | L2 | 2.5 | 7 |
| Ex. 8 | W12 | 5 | D2 | 20 | L2 | 2.5 | 5 |
| Ex. 9 | W12 | 5 | D2 | 20 | L2 | 2.5 | 5 |
| Ex. 10 | W12 | 5 | D2 | 20 | L2 | 2.5 | 5 |
| Ex. 11 | W12 | 5 | D2 | 20 | L2 | 2.5 | 6 |
| Ex. 12 | W12 | 5 | D2 | 20 | L2 | 2.5 | 7 |
| Ex. 13 | W12 | 5 | D2 | 20 | L2 | 2.5 | 7 |
| Ex. 14 | W12 | 5 | D2 | 20 | L2 | 2.5 | 5 |
| Ex. 15 | W12 | 5 | D2 | 20 | L2 | 2.5 | 8 |
| Ex. 16 | W12 | 5 | D2 | 20 | L2 | 2.5 | 5 |
| Ex. 17 | W12 | 5 | D2 | 20 | L2 | 2.5 | 6 |
| Ex. 18 | W12 | 5 | D2 | 20 | L2 | 2.5 | 7 |
| Ex. 19 | W12 | 5 | D2 | 20 | L2 | 2.5 | 7 |
| Ex. 20 | W12 | 5 | D2 | 20 | L2 | 2.5 | 7 |
| Ex. 21 | W12 | 5 | D2 | 20 | L2 | 2.5 | 8 |
| Ex. 22 | W12 | 5 | D2 | 20 | L2 | 2.5 | 8 |
| Ex. 23 | W12 | 5 | D2 | 20 | L2 | 2.5 | 8 |
| Ex. 24 | W12 | 5 | D2 | 20 | L2 | 2.5 | 7 |
| Ex. 25 | W12 | 5 | D2 | 20 | L2 | 2.5 | 8 |
| Ex. 26 | W12 | 5 | D2 | 20 | L2 | 2.5 | 7 |
| Ex. 27 | W1 | 5 | D2 | 20 | L2 | 2.5 | 7 |
| Ex. 28 | W2 | 5 | D2 | 20 | L2 | 2.5 | 7 |
| Ex. 29 | W3 | 5 | D2 | 20 | L2 | 2.5 | 7 |
| Ex. 30 | W4 | 5 | D1/D2 | 5/15 | L2 | 2.5 | 7 |
| Ex. 31 | W5 | 5 | D2 | 20 | L2 | 2.5 | 8 |
| Ex. 32 | W6 | 5 | D2 | 20 | L2 | 2.5 | 8 |
| Ex. 33 | W7 | 5 | D1/D2 | 5/15 | L2 | 2.5 | 7 |
| Ex. 34 | W8 | 5 | D2 | 20 | L2 | 2.5 | 6 |
| Ex. 35 | W9 | 5 | D2 | 20 | L2 | 2.5 | 5 |
| Ex. 36 | W10 | 5 | D2 | 20 | L2 | 2.5 | 7 |
| Ex. 37 | W11 | 5 | D2 | 20 | L2 | 2.5 | 5 |
| Ex. 38 | W13 | 5 | D2 | 20 | L2 | 2.5 | 5 |
| Ex. 39 | W12 | 5 | D2 | 20 | L2 | 2.5 | 1 |
| Ex. 40 | W12 | 5 | D2 | 20 | L2 | 2.5 | 3 |
| Ex. 41 | W12 | 5 | D2 | 20 | L2 | 2.5 | 45 |
| Comp. Ex. 1 | W12 | 5 | D2 | 20 | L2 | 2.5 | 6 |
| Comp. Ex. 2 | W12 | 5 | D2 | 20 | L2 | 2.5 | 5 |
| Comp. Ex. 3 | W12 | 5 | D2 | 20 | L2 | 2.5 | 5 |
| Comp. Ex. 3a | W12 | 5 | D2 | 20 | L2 | 2.5 | 6 |

TABLE 8

| | The photochromic characteristics | | | | The adhesive strength (N/25 mm) | | | |
| --- | --- | --- | --- | --- | --- | --- | --- | --- |
| Ex. No. | λ max | The color optical density | The color fading speed | The durability | Initial | After boiling test | After weather resistance test | Sweet proof test (hour) |
| Ex. 1 | 585 | 1.0 | 45 | 93 | 140 | 110 | 110 | 120 |
| Ex. 2 | 585 | 1.0 | 45 | 93 | 200 | 180 | 190 | 336 |
| Ex. 3 | 585 | 1.0 | 45 | 93 | 200 | 180 | 180 | 288 |
| Ex. 4 | 585 | 1.0 | 90 | 92 | 170 | 140 | 130 | 288 |
| Ex. 5 | 585 | 1.0 | 40 | 90 | 200 | 180 | 190 | 336 |
| Ex. 6 | 585 | 1.1 | 35 | 80 | 180 | 150 | 150 | 288 |
| Ex. 7 | 585 | 1.0 | 45 | 93 | 200 | 180 | 180 | 336 |
| Ex. 8 | 585 | 1.0 | 40 | 90 | 200 | 170 | 180 | 336 |
| Ex. 9 | 585 | 1.1 | 35 | 70 | 170 | 130 | 140 | 240 |
| Ex. 10 | 585 | 1.0 | 110 | 90 | 140 | 120 | 120 | 168 |
| Ex. 11 | 585 | 1.0 | 45 | 93 | 200 | 180 | 180 | 360 |
| Ex. 12 | 585 | 1.1 | 40 | 93 | 170 | 140 | 150 | 240 |
| Ex. 13 | 585 | 1.0 | 45 | 93 | 200 | 180 | 180 | 360 |
| Ex. 14 | 585 | 1.0 | 45 | 92 | 170 | 140 | 140 | 240 |
| Ex. 15 | 585 | 1.0 | 80 | 90 | 160 | 140 | 140 | 240 |
| Ex. 16 | 585 | 1.0 | 45 | 92 | 220 | 190 | 200 | 288 |
| Ex. 17 | 585 | 1.0 | 45 | 93 | 220 | 190 | 200 | 408 |
| Ex. 18 | 585 | 1.0 | 45 | 93 | 230 | 190 | 200 | 408 |
| Ex. 19 | 585 | 0.9 | 50 | 92 | 200 | 170 | 160 | 240 |
| Ex. 20 | 585 | 1.1 | 40 | 90 | 190 | 160 | 160 | 288 |
| Ex. 21 | 585 | 1.0 | 45 | 92 | 200 | 180 | 190 | 360 |
| Ex. 22 | 585 | 1.0 | 45 | 93 | 210 | 180 | 190 | 360 |
| Ex. 23 | 585 | 1.0 | 45 | 93 | 200 | 180 | 180 | 312 |
| Ex. 24 | 585 | 0.9 | 50 | 91 | 180 | 160 | 170 | 240 |
| Ex. 25 | 585 | 1.0 | 40 | 93 | 210 | 180 | 180 | 384 |
| Ex. 26 | 585 | 1.0 | 45 | 90 | 230 | 200 | 200 | 408 |
| Ex. 27 | 570 | 1.0 | 50 | 92 | 160 | 130 | 140 | 216 |
| Ex. 28 | 570 | 1.0 | 50 | 92 | 200 | 170 | 180 | 360 |
| Ex. 29 | 570 | 1.0 | 50 | 92 | 220 | 190 | 190 | 384 |
| Ex. 30 | 570 | 1.0 | 50 | 85 | 190 | 140 | 140 | 216 |
| Ex. 31 | 570 | 1.0 | 50 | 92 | 200 | 170 | 180 | 360 |
| Ex. 32 | 570 | 1.0 | 50 | 91 | 220 | 180 | 180 | 360 |
| Ex. 33 | 570 | 1.0 | 50 | 85 | 190 | 140 | 140 | 216 |

TABLE 8-continued

| Ex. No. | The photochromic characteristics | | | The durability | The adhesive strength (N/25 mm) | | | Sweet proof test (hour) |
| --- | --- | --- | --- | --- | --- | --- | --- | --- |
| | λ max | The color optical density | The color fading speed | | Initial | After boiling test | After weather resistance test | |
| Ex. 34 | 570 | 1.0 | 50 | 88 | 140 | 110 | 120 | 168 |
| Ex. 35 | 570 | 1.0 | 50 | 92 | 190 | 140 | 140 | 216 |
| Ex. 36 | 570 | 1.0 | 50 | 92 | 200 | 160 | 170 | 240 |
| Ex. 37 | 570 | 1.0 | 50 | 92 | 220 | 190 | 190 | 408 |
| Ex. 38 | 570 | 1.0 | 50 | 92 | 190 | 150 | 150 | 216 |
| Ex. 39 | 570 | 1.0 | 50 | 92 | 170 | 140 | 150 | 264 |
| Ex. 40 | 570 | 1.0 | 50 | 92 | 190 | 170 | 170 | 384 |
| Ex. 41 | 570 | 1.0 | 50 | 80 | 220 | 180 | 190 | 408 |
| Comp. Ex. 1 | 585 | 1.0 | 45 | 93 | 140 | 100 | 110 | 48 |
| Comp. Ex. 2 | 585 | 1.0 | 45 | 93 | 180 | 120 | 120 | 96 |
| Comp. Ex. 3 | 585 | 1.0 | 50 | 91 | 120 | 80 | 90 | 96 |
| Comp. Ex. 3a | 585 | 1.0 | 46 | 93 | 190 | 120 | 120 | 96 |

Comparative Examples 4, 5

The polyurethane resin (I) comprising the isocyanate group in the terminal end of the molecular chain, and the polyurethane resin (II) comprising the hydroxyl group at the terminal end of the molecular chain were synthesized as described in below.

(The Synthesis of the Polyurethane Resin (I))

100 g of polycaprolactonepolyol (Praccel made by DAICEL CORPORATION) having the number average molecular weight of 1000, 39.5 g of 4,4'-methylenebis(cyclohexylisocyanate) were added into the three-necked flask having a stirring blade, a cooling pipe, a thermometer, and nitrogen gas introducing pipe; and reacted for 6 hours at 90° C. under the nitrogen atmosphere, thereby obtained the prepolymer (the polyurethane resin (I)) having the isocyanate group at the terminal end. The molecular weight of the obtained prepolymer (the polyurethane resin (I)) was 2500 in terms of polyoxyethylene (the theoretical value; 2800).

(The Synthesis of the Polyurethane Resin (II))

Into a three-necked flask having a stirring blade, a cooling pipe, a thermometer, and a nitrogen gas introducing pipe, 100 g of polycaprolactone polyol (PLACCEL made by Daicel Corporation) having the number average molecular weight of 1,000 and 61.3 g of hydrogenated diphenylmethane diisocyanate were added and reacted under nitrogen atmosphere at 90° C. for 6 hours to obtain a prepolymer having an isocyanate group at its end. Then, after 200 ml of DMF was added, 12.7 g of 1,4-butanediol was added dropwise under nitrogen atmosphere. After the dropping was completed, reaction was carried out at 90° C. for 24 hours to synthesize polyurethane resin (II) having a hydroxyl group at the end of its molecular chain. The molecular weight of the obtained polyurethane resin (II) was 20,000 (theoretical value; 18,000) in terms of polyoxyethylene.

Polyurethane resin (I) and polyurethane resin (II) obtained as mentioned above, and THF as an organic solvent were used in the blending amount shown in Table 9, and 0.15 g of photochromic compound (PC1) was used. Further, there were added 20 mg of ethylenebis(oxyethylene)bis[3-(5-tert-butyl-4-hydroxy-m-tolyl)propionate] as an antioxidant and 2.5 mg of DOW CORNING TORAY L-7001 as a surfactant, and mixed with stirring at room temperature to obtain a photochromic composition.

The above photochromic composition was made as a first adhesive layer, and the polycarbonate sheet having the second adhesive layer shown in Table 10 was used to produce a multilayer sheet by the same method as the example 2 (the first adhesive layer: the thickness of a photochromic adhesive sheet, the tetrahydrofuran insoluble content, and the high molecular weight component are shown in Table 9). The evaluation results of the obtained multilayer sheets are shown in Table 11.

Comparative Example 6

With use of the following method, synthesis of polyurethane-urea resin (III) was tried.

(Synthesis of Polyurethane Resin (III))

Into a three-necked flask having a stirring blade, a cooling pipe, a thermometer, and a nitrogen gas introducing pipe, 46.0 g of 4,4'-methylenebis(cyclohexylisocyanate), 32.8 g of polyethylene glycol having the number average molecular weight of 400, and 2.7 g of ethoxylated trimethylol propane were added and reacted under nitrogen atmosphere at 90° C. for 6 hours to obtain a prepolymer having an isocyanate group at its end. The end point of the reaction was confirmed by a back-titration method of the isocyanate group. After completion of the reaction, the reaction liquid was cooled to about 30° C. and was then dissolved into 900 g of THF. Then, there were mixed therewith the photochromic compound PC1 (2.85 g), 380 mg of ethylenebis(oxyethylene)bis[3-(5-tert-butyl-4-hydroxy-m-tolyl)propionate] as an antioxidant, and 50 mg of DOW CORNING TORAY L-7001 as a surfactant. Then, once 13.4 g of 2,4-diamino-3,5-diethyl-toluene as a chain extender was dropped, gelation occurred. The obtained gelled substance (photochromic composition) serving as the first adhesive layer was sandwiched between two polycarbonate sheets having the second adhesive layer which are the same as those used in the example 2, and a multilayer sheet was produced by the same method as the example 2. The amount of the tetrahydrofuran insoluble content was 100 mass %. Moreover, since it was a gelled substance, GPC measurement was not possible. The evaluation result of the obtained multilayer sheet is shown in Table 11.

TABLE 9

First adhesive layer (precursor composition) and Photochromic composition

| Comp. Ex. No. | Polyurethane resin Type | Polyurethane resin The added amount (g) | Polyurethane resin Type | Polyurethane resin The added amount (g) | D component Type | D component The added amount (g) | B component Type | B component The added amount (g) | C component Type | C component The added amount (g) | The Others Type | The Others The added amount (mg) | The film thickness (μm) | THF insoluble content (mass %) | High molecular weight component (%) |
|---|---|---|---|---|---|---|---|---|---|---|---|---|---|---|---|
| Comp. Ex. 4 | (I) | 2.5 | (II) | 2.5 | D6 | 20 | PC1 | 0.15 | — | — | L1/L2 | 20/2.5 | 40 | 0 | 0 |
| Comp. Ex. 5 | (I) | 2.5 | (II) | 2.5 | D6 | 20 | PC1 | 0.15 | — | — | L1/L2 | 20/2.5 | 40 | 0 | 0 |
| Comp. Ex. 6 | (III) | 94.9 | — | — | D6 | 900 | PC1 | 2.85 | — | — | L1/L2 | 380/50 | 40 | — | — |

TABLE 10

The second adhesive layer

| Comp. Ex. No. | E component Type | E component The added amount (g) | D component Type | D component The added amount (g) | The others Type | The others The added amount (mg) | The film thickness (μm) |
|---|---|---|---|---|---|---|---|
| Comp. Ex. 4 | — | — | — | — | — | — | — |
| Comp. Ex. 5 | W12 | 5 | D2 | 20 | L2 | 2.5 | 6 |
| Comp. Ex. 6 | W12 | 5 | D2 | 20 | L2 | 2.5 | 6 |

TABLE 11

| Comp. Ex. No. | The photochromic characteristics λ max | The photochromic characteristics The color optical density | The photochromic characteristics The color fading speed | The durability | The adhesive strength (N/25 mm) Initial | The adhesive strength (N/25 mm) After boiling test | The adhesive strength (N/25 mm) After weather resistance test | Sweat proof test (hr.) |
|---|---|---|---|---|---|---|---|---|
| Comp. Ex. 4 | 585 | 1.0 | 50 | 60 | 80 | 40 | 50 | 48 |
| Comp. Ex. 5 | 585 | 1.0 | 50 | 60 | 130 | 100 | 100 | 96 |
| Comp. Ex. 6 | 585 | 0.9 | 120 | 80 | 130 | 100 | 100 | 72 |

As is clear from the above-mentioned examples 1 to 41, the multilayer sheet, which is obtained by using the photochromic composition containing a polyurethane-urea resin in which a tetrahydrofuran insoluble content is 20.0 to 90.0 mass %, has excellent photochromic characteristics, adhesive strength, heat resistance, and sweat proofness.

On the other hand, with respect to the multilayer sheet (comparative examples 1 to 6) using the photochromic composition containing a polyurethane-urea resin in which a tetrahydrofuran insoluble content is less than 20.0 mass % or more than 90.0 mass %, adhesive strength was decreased and all physical properties were not satisfied at the same time.

Example 42

Preparation of Precursor Composition 1,000 g of a THF solution of the soluble polyurethane-urea resin (U1) was added into an eggplant flask, and THF was distilled away by reduced pressure distillation to obtain 200 g of a solid of U1. Then, 260 g of diethyl ketone and 111 g of t-butyl alcohol were added to the obtained solid of U1, and dissolved with stirring at 50° C. to afford a solution of U1. To the solution were added 6.5 g of the photochromic compound (PC1), 16 g of the isomer mixture of 4,4'-methylenebis(cyclohexylisocyanate) (C1), additionally 0.8 g of ethylenebis(oxyethylene)bis[3-(5-tert-butyl-4-hydroxy-m-tolyl)propionate] as an antioxidant, and 0.1 g of DOW CORNING TORAY L-7001 as a surfactant. Then, mixing with stirring was performed at room temperature to obtain a precursor composition. The viscosity of the obtained precursor composition was 20,000 cP. Stability of the isocyanate group of the isomer mixture of 4,4'-methylenebis(cyclohexylisocyanate) (C1) was 99% at 25° C. for 50 hours, and the tetrahydrofuran insoluble content was 34.8 mass %. The measuring methods of the viscosity and stability of the isocyanate group are shown below.

Viscosity

The obtained precursor composition was measured at 25° C. using a Cannon-Fenske viscometer.

Isocyanate Group Stability

The obtained precursor composition was applied to a film made of PET and dried for 5 minutes at 110° C. to obtain a sheet of the photochromic adhesive layer. The obtained photochromic adhesive layer was observed with an infrared absorption spectrum, and the stability of the isocyanate group was identified based on the ratio of a peak area value of 2,150 $cm^{-1}$ to 2,400 $cm^{-1}$ derived from the isocyanate group and a peak area value of 2,700 $cm^{-1}$ to 3,100 $cm^{-1}$ derived from methylene.

Adjustment of Adhesive Agent for the Second Adhesive Layer

The same precursor composition was obtained by the same method as preparation of the adhesive agent for the second adhesive layer in the example 2.

Production of Multilayer Sheet

A multilayer sheet was produced using a coater (made by Tester Sangyo Co., Ltd.). The adhesive agent for the second adhesive layer was coated on a 400 μm-thick polycarbonate sheet at a coating speed of 0.5 m/min, and dried at a drying temperature of 110° C. for 3 minutes to obtain a polycarbonate sheet having the second adhesive layer having a film thickness of 5 μm.

The above-mentioned precursor composition was coated on a film made of PET (PUREX film, made by Teijin-DuPont Films Japan Limited, with a silicon-coated film) at a coating speed of 0.3 m/min, and dried at a drying temperature of 100° C. for 5 minutes to obtain a photochromic adhesive layer having a thickness of about 40 μm. Then, a polycarbonate sheet having the second adhesive layer was stuck at a pressure of 0.1 MPa. Subsequently, there was removed the PET film of the laminate in which the PET film having the above-mentioned precursor composition applied thereon was stuck to the polycarbonate sheet having the second adhesive layer. Then, a polycarbonate sheet having the second adhesive layer was stuck to the released surface at a pressure of 0.1 MPa to obtain a multilayer sheet. After the obtained multilayer sheet was left at 40° C. under a vacuum for 24 hours, heating treatment was performed at 110° C. for 60 minutes, and humidifying treatment was subsequently performed at 60° C. and 100% RH for 24 hours. Finally, the multilayer sheet was left at 40° C. under a vacuum for 24 hours to obtain a multilayer sheet having the desired photochromic characteristic. When appearance of the obtained multilayer sheet was evaluated, defective appearance was not observed. When the amount of the residual solvent was measured, it was 0.01%. Adhesion stable time in the sweat proof test was 360 hours.

The appearance evaluation and measurement of the amount of the residual solvent were performed with the following methods.

Appearance Evaluation

For evaluation of appearance, a high pressure mercury lamp (made by Ushio Inc.) was irradiated to the surface of the multilayer sheet of 1,000 cm$^2$, and its projection was observed visually to check whether defective appearance such as wrinkles and distortion occurred on the multilayer sheet surface. The valuation criteria were as follows.

a: Defect was not observed.
b: A defective portion was 10% or less of the area.
c: A defective portion was more than 10% of the area.

Amount of Residual Solvent

The precursor composition was coated on a film made of PET at a coating speed of 0.3 m/min. After drying at a drying temperature of 100° C. for 5 minutes, the photochromic adhesive layer was released from the PET film, and the amount of residual solvent was measured using a headspace gas chromatograph (GC-2010 Plus/TurboMatrix HS-40, made by Shimadzu Corporation).

Examples 43 to 58

The precursor composition was adjusted by the same method as the example 42 except for the (D) organic solvent shown in Table 12. Moreover, the multilayer sheet was produced by the same method as the example 42. The evaluation results of the obtained multilayer sheets are shown in Table 13.

TABLE 12

| | A component | | | | | | | | |
|---|---|---|---|---|---|---|---|---|---|
| | A' component | | C component | | D component | | | | |
| Ex. No. | Type | The added amount (g) | Type | The added amount (g) | Type | The added amount (g) | The viscosity (cP) | The isocyanate stability (%) | THF insoluble content (mass %) |
| Ex. 42 | U1 | 200 | C1 | 16 | D7/D8 | 260/111 | 20000 | 99 | 34.6 |
| Ex. 43 | U1 | 200 | C1 | 16 | D7/D8 | 420/180 | 4000 | 100 | 34.8 |
| Ex. 44 | U1 | 200 | C1 | 16 | D7/D8 | 327/140 | 11000 | 99 | 34.5 |
| Ex. 45 | U1 | 200 | C1 | 16 | D7/D8 | 228/98 | 27000 | 98 | 34.5 |
| Ex. 46 | U1 | 200 | C1 | 16 | D7/D8 | 193/83 | 46000 | 95 | 34.2 |
| Ex. 47 | U1 | 200 | C1 | 16 | D7/D8 | 1334/37 | 55000 | 100 | 34.8 |
| Ex. 48 | U1 | 200 | C1 | 16 | D7/D8 | 297/74 | 33000 | 100 | 34.8 |
| Ex. 49 | U1 | 200 | C1 | 16 | D7/D8 | 204/167 | 31000 | 95 | 33.0 |
| Ex. 50 | U1 | 200 | C1 | 16 | D7/D8 | 167/204 | 53000 | 93 | 32.6 |
| Ex. 51 | U1 | 200 | C1 | 16 | D7/D1 | 260/111 | 19000 | 90 | 31.2 |
| Ex. 52 | U1 | 200 | C1 | 16 | D7/D1 | 228/98 | 25000 | 86 | 29.3 |
| Ex. 53 | U1 | 200 | C1 | 16 | D7/D1 | 204/167 | 30000 | 78 | 27.2 |
| Ex. 54 | U1 | 200 | C1 | 16 | D7 | 800 | 4200 | 100 | 34.8 |
| Ex. 55 | U1 | 200 | C1 | 16 | D6 | 800 | 4000 | 100 | 34.8 |
| Ex. 56 | U1 | 200 | C1 | 16 | D6 | 600 | 8000 | 100 | 34.8 |
| Ex. 57 | U1 | 200 | C1 | 16 | D6 | 467 | 32000 | 100 | 34.8 |
| Ex. 58 | U1 | 200 | C1 | 16 | D7/D9 | 297/74 | 30000 | 70 | 23.5 |

In the Exs. 42 to 58, the PC1 (B component) added amount: 6.5 g, the other components (L1/L2) added amount: 0.8 g/0.1 g

TABLE 13

| Ex. No. | The film thickness (μm) (μm) | Appearance evaluation | The amount of residual solvent (%) (%) | Sweat proof test (hr.) |
|---|---|---|---|---|
| Ex. 42 | 40 | a | 0.01 | 432 |
| Ex. 43 | 41 | a | 0.03 | 408 |
| Ex. 44 | 40 | a | 0 | 432 |
| Ex. 45 | 40 | b | 0.07 | 408 |
| Ex. 46 | 43 | b | 0 | 408 |

TABLE 13-continued

| Ex. No. | The film thickness (μm) (μm) | Appearance evaluation | The amount of residual solvent (%) (%) | Sweat proof test (hr.) |
|---|---|---|---|---|
| Ex. 47 | 40 | c | 0.03 | 408 |
| Ex. 48 | 41 | a | 0.02 | 408 |
| Ex. 49 | 40 | a | 0.01 | 408 |
| Ex. 50 | 40 | b | 0.01 | 408 |
| Ex. 51 | 40 | a | 0.01 | 384 |
| Ex. 52 | 42 | a | 0 | 336 |
| Ex. 53 | 41 | a | 0 | 288 |
| Ex. 54 | 40 | b | 0.09 | 408 |
| Ex. 55 | 40 | b | 0.03 | 384 |
| Ex. 56 | 41 | a | 0 | 408 |
| Ex. 57 | 42 | a | 0 | 408 |
| Ex. 58 | 42 | a | 0 | 240 |

Example 59

The multilayer sheet obtained in the example 42 was bending treated into a spherical surface shape by heat press molding. A spherical surface-shaped pair of convex mold and concave mold having a diameter of 8 cm was installed on a heat pressing machine. The multilayer sheet of 10 cm square was mounted in the concave mold with a fixing jig, and the convex and concave molds were heated at 150° C. for 15 minutes. The multilayer sheet was heat pressed with the heated convex mold at a pressure of 25 cm²/kg, and left for 5 minutes and cooled to 50° C. or less. Then, the sheet was separated from the mold to obtain a multilayer sheet processed into a spherical surface shape. Ten sheets of the multilayer sheet were produced by the same method. When the yield of the ten sheets was checked with the following evaluation methods, it was at 70% (air bubbles were observed in three of the multilayer sheets).

Yield Evaluation Method

A high pressure mercury lamp was irradiated to the surface of the bending-treated multilayer sheet as with the appearance evaluation method of the example 42, and its projection was observed visually to check whether air bubbles were generated in the multilayer sheet. A sheet on which air bubbles were not confirmed was considered as a good product, and a sheet having air bubbles was considered as a bad product. The yield was evaluated from a proportion of the obtained good product.

Example 60

After the multilayer sheet obtained in the example 42 was subjected to pre-heating treatment under ordinary pressure at 80° C. for 1 hour, the multilayer sheet was processed into a spherical surface shape by the same method as the example 59. The yield of the processed multilayer sheet was 90%. The yield was calculated by the same method as the example 59.

Examples 61 to 67

The bending treatment was carried out by the same method as the example 60 except for the bending treatment temperature and pre-heating condition shown in Table 14. All were carried out under ordinary pressure. The evaluation results of the obtained multilayer sheets are also shown in Table 14.

TABLE 14

| Ex. No. | The bending treatment temp. (° C.) | The pre-heating treatment condition | | Yield evaluation (%) |
|---|---|---|---|---|
| | | Temp. (° C.) | Time (min.) | |
| Ex. 59 | 150 | — | — | 70 |
| Ex. 60 | 150 | 80 | 60 | 90 |
| Ex. 61 | 130 | 80 | 60 | 80 |
| Ex. 62 | 170 | — | — | 50 |
| Ex. 63 | 170 | 80 | 60 | 90 |
| Ex. 64 | 150 | 80 | 10 | 70 |
| Ex. 65 | 150 | 80 | 30 | 90 |
| Ex. 66 | 150 | 100 | 5 | 70 |
| Ex. 67 | 150 | 100 | 10 | 90 |

Example 68

The bending-treated multilayer sheet obtained in the example 60 was mounted on a spherical surface-shaped mold, and heated at 100° C. Polycarbonate resin pellets (PANLITE, made by Teijin Limited) subjected to pre-heating at 120° C. for 5 hours were charged in an injection molding machine, and the pellets were melt by heating at 300° C. and 60 rpm. The melt was injected at an injection pressure of 1,400 kg/cm² to the mold on which the multilayer sheet was mounted. Thereby, the multilayer sheet was united with the polycarbonate resin to produce a photochromic glasses lens composed of polycarbonate.

The invention claimed is:

1. A photochromic composition comprising:
   (A) a polyurethane-urea resin having a urea bond in a molecular chain, in which a tetrahydrofuran insoluble content is 20.0 to 90.0% by mass; and
   (B) a photochromic compound.

2. The photochromic composition as set forth in claim 1, wherein (A) the polyurethane-urea resin comprises a resin obtained by reacting,
   (A') a soluble polyurethane-urea resin having a urea bond in a molecular chain and that is soluble in tetrahydrofuran, and
   (C) a polyisocyanate compound having at least two isocyanate groups in the molecule.

3. The photochromic composition as set forth in claim 2, wherein (C) the polyisocyanate compound is a compound having an isocyanate group bonded to a secondary carbon.

4. The photochromic composition as set forth in claim 2, wherein a content of (C) the polyisocyanate compound is 4.0 to 20.0 parts by mass based on 100 parts by mass of (A') the soluble polyurethane-urea resin.

5. The photochromic composition as set forth in claim 2, wherein (A') the soluble polyurethane-urea resin is a resin obtained by reacting,
   (A1) at least one polyol compound selected from the group consisting of polycarbonate polyol and polycaprolactone polyol,
   (A2) a diisocyanate compound having two isocyanate groups in the molecule,
   (A3) an amino group-containing compound having two or more amino groups in the molecule, and
   (A4) a functionalization compound having one or two groups, in the molecule, capable of reacting with the isocyanate group and having the piperidine structure in the molecule.

6. The photochromic composition as set forth in claim 5, wherein an amount ratio of the components (A1), (A2), (A3), and (A4) used when obtaining the soluble polyurethane-urea resin (A') satisfies $n1:n2:n3:n4=0.30$ to $0.89:1:0.10$ to $0.69:0.01$ to $0.20$ when a total mol number of a hydroxyl group included in said component (A1) is n1, a total mol number of an isocyanate group included in said component (A2) is n2, a total mol number of an amino group included in said component (A3) is n3, and a total mol number of a group capable of reacting with an isocyanate group in said component (A4) is n4.

7. The photochromic composition as set forth in claim 1, wherein a content of (B) the photochromic compound is 0.1 to 20 parts by mass based on 100 parts by mass of (A) the polyurethane-urea resin.

8. An optical article having a multilayer structure wherein two optical sheets or films facing each other are bound via an adhesive layer comprising the photochromic composition as set forth in claim 1.

9. An optical article having a multilayer structure wherein two optical sheets or films facing each other are bound via a first adhesive layer comprising the photochromic composition as set forth in claim 1, and second adhesive layers present at both sides of said first adhesive layer.

10. The optical article as set forth in claim 9, wherein
the two optical sheets or films facing each other comprise polycarbonate, and
the second adhesive layers comprise a polyurethane resin having a surface free energy of 40.0 to 65.0 $mJ/m^2$.

\* \* \* \* \*